US012578668B2

United States Patent

Akagi

(10) Patent No.: US 12,578,668 B2
(45) Date of Patent: Mar. 17, 2026

(54) EXPOSURE HEAD AND IMAGE FORMING APPARATUS

(71) Applicant: CANON KABUSHIKI KAISHA, Tokyo (JP)

(72) Inventor: Daisuke Akagi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 235 days.

(21) Appl. No.: 18/203,105

(22) Filed: May 30, 2023

(65) Prior Publication Data

US 2023/0324826 A1 Oct. 12, 2023

Related U.S. Application Data

(63) Continuation of application No. PCT/JP2021/031200, filed on Aug. 25, 2021.

(30) Foreign Application Priority Data

Dec. 18, 2020 (JP) ................................ 2020-210272

(51) Int. Cl.

*G03G 15/04* (2006.01)
*G03G 15/043* (2006.01)

(52) U.S. Cl.

CPC ... *G03G 15/04054* (2013.01); *G03G 15/0409* (2013.01); *G03G 15/043* (2013.01)

(58) Field of Classification Search

CPC ......... G03G 15/04054; G03G 15/0409; G03G 15/043; G03G 15/326; G03G 15/80;

(Continued)

(56) References Cited

U.S. PATENT DOCUMENTS 8,258,723 B2 9/2012 Nagumo
8,884,555 B2 11/2014 Nagumo (Continued)

FOREIGN PATENT DOCUMENTS

BR 10-2016-006173 A2 9/2016
CN 1623239 A 6/2005

(Continued)

OTHER PUBLICATIONS

English Translation of 2020075437 (Year: 2020).*

(Continued)

*Primary Examiner* — Shelby L Fidler
*Assistant Examiner* — Tracey M McMillion
(74) *Attorney, Agent, or Firm* — Venable LLP

(57) ABSTRACT

An exposure head configured to expose a photosensitive drum includes: a substrate; a plurality of strip-shaped semiconductor chips each including a plurality of light emitting elements that emit light and a drive circuit that drives the light emitting element, the plurality of semiconductor chips being arranged on the substrate; and a lens array configured to collect light from the light emitting elements on the photosensitive drum. The drive circuit operates between a first potential and a second potential, the light emitting element operates between a third potential and a fourth potential, and a potential difference between the third potential and the fourth potential is equal to or larger than a potential difference between the first potential and the second potential.

17 Claims, 21 Drawing Sheets

(58) Field of Classification Search
CPC ......... B41J 2/45; B41J 2/451; G06K 15/1247; H04N 1/036; H04N 1/06
See application file for complete search history.

(56) References Cited

U.S. PATENT DOCUMENTS

| | | | | |
|---|---|---|---|---|
| 11,016,407 | B2 | 5/2021 | Furuta | |
| 11,050,217 | B2 | 6/2021 | Kondo et al. | |
| 11,303,097 | B2 | 4/2022 | Kondo et al. | |
| 2005/0224810 | A1 | 10/2005 | Ohno | |
| 2007/0215594 | A1 | 9/2007 | Hashimoto et al. | |
| 2010/0026214 | A1 | 2/2010 | Nagumo | |
| 2010/0118100 | A1 | 5/2010 | Ohno | |
| 2012/0001996 | A1 * | 1/2012 | Nagumo | B41J 2/45 315/312 |
| 2012/0301164 | A1 | 11/2012 | Nagumo | |
| 2013/0235142 | A1 | 9/2013 | Katagiri et al. | |
| 2015/0069931 | A1 | 3/2015 | Yoshida | |
| 2016/0282780 | A1 | 9/2016 | Nakase et al. | |
| 2019/0326035 | A1 | 10/2019 | Akagi | |
| 2020/0150554 | A1 | 5/2020 | Furuta | |
| 2020/0244039 | A1 | 7/2020 | Kondo et al. | |
| 2021/0048761 | A1 | 2/2021 | Furuta | |
| 2021/0091535 | A1 | 3/2021 | Kondo et al. | |

FOREIGN PATENT DOCUMENTS

| | | | | | |
|---|---|---|---|---|---|
| CN | 101039367 | A | | 9/2007 | |
| CN | 101734021 | A | | 6/2010 | |
| CN | 103309197 | A | | 9/2013 | |
| CN | 204149679 | U | | 2/2015 | |
| CN | 111176085 | A | | 5/2020 | |
| GB | 2 099 221 | A | | 12/1982 | |
| JP | 2004-306446 | A | | 11/2004 | |
| JP | 2008-105333 | A | | 5/2008 | |
| JP | 2010-040641 | A | | 2/2010 | |
| JP | 2011-194810 | A | | 10/2011 | |
| JP | 2012-011654 | A | | 1/2012 | |
| JP | 2015-112856 | A | | 6/2015 | |
| JP | 2015162428 | A | * | 9/2015 | |
| JP | 2016-043518 | A | | 4/2016 | |
| JP | 2017-094499 | A | | 6/2017 | |
| JP | 2019-142116 | A | | 8/2019 | |
| JP | 2019-214153 | A | | 12/2019 | |
| JP | 2020075437 | A | * | 5/2020 | G03G 15/04054 |
| JP | 2020-120018 | A | | 8/2020 | |

OTHER PUBLICATIONS

English Translation of 2015162428 (Year: 2015).*

International Search Report and Written Opinion of the International Searching Authority for International Patent Application No. PCT/JP2021/031200.

Co-pending U.S. Appl. No. 18/351,721, filed Jul. 13, 2023.

Co-pending U.S. Appl. No. 18/232,893, filed Aug. 11, 2023.

Sep. 3, 2024 Office Action in Japanese Patent Application No. 2020-210272 (with English translation).

Jan. 31, 2025 Extended Search Report in European Patent Application No. 21 90 6060.5.

Jun. 20, 2025 Chinese Patent Application Pub. No. 202180083734.9.

Nov. 7, 2025 Office Action in Chinese Patent Application Pub. No. 202180083734.9.

* cited by examiner

EXPOSURE HEAD AND IMAGE FORMING APPARATUS

CROSS-REFERENCE TO RELATED APPLICATIONS

This application is a Continuation of International Patent Application No. PCT/JP2021/031200, filed Aug. 25, 2021, which claims the benefit of Japanese Patent Application No. 2020-210272, filed Dec. 18, 2020, both of which are hereby incorporated by reference herein in their entirety.

BACKGROUND OF THE INVENTION

Field of the Invention

The present invention relates to an exposure head that exposes a photosensitive drum, and an image forming apparatus including the exposure head.

Description of the Related Art

Hitherto, as a printer of an electrophotographic system, a printer in which a photosensitive drum is exposed by an exposure head using an LED, an organic EL, or the like to form a latent image is generally known. Such an exposure head includes light emitting element rows arranged in a longitudinal direction of the photosensitive drum and a rod lens array that forms an image of light of the light emitting element rows on the photosensitive drum. The LED or organic EL serving as the light emitting element is a light emitting element array in which an irradiation direction of light from a light emitting surface is parallel to an optical axis of the rod lens array.

Here, in the exposure head, a length of the light emitting element array is determined according to a width of an image forming region on the photosensitive drum, and an interval between the light emitting elements is determined according to an image resolution of the printer. For example, in a 1200 dpi printer, since an interval between pixels is 21.16 μm (rounded down to two decimal places), the interval between the light emitting elements is also 21.16 μm. Since the printer using such an exposure head uses a smaller number of components than a printer of a laser scanning system in which deflection scanning of a laser beam is performed using a polygon motor, it is easy to reduce the size and cost of the apparatus.

In addition, in recent years, a technology for reducing the size of the apparatus by mounting a light emitting element and a drive circuit on the same chip is also known. For example, there is known an exposure head in which an integrated circuit for driving and an electrode are formed on a Si substrate, and an organic EL film is deposited thereon to integrate a light emitting element and a drive circuit as one chip. Further, Japanese Patent Laid-Open No. 2015-112856 discloses an exposure head in which a TFT circuit and an organic EL are provided on a transparent glass substrate.

However, in an exposure head having a configuration in which a light emitting element and a drive circuit are integrated as one chip according to the related art, it is necessary to form an integrated circuit by a semiconductor process with a relatively high withstand voltage in order to secure a forward voltage of the light emitting element and obtain a predetermined light emission quantity. In a case where the drive circuit is formed by such a semiconductor process with a high withstand voltage, there is a problem that a size of a transistor increases, and as a result, a chip size increases.

SUMMARY OF THE INVENTION

An object of the present invention is to provide an exposure head capable of forming a drive circuit by a semiconductor process with a low withstand voltage while securing a forward voltage of a light emitting element and capable of reducing a chip size, in a configuration in which the light emitting element and the drive circuit are formed as one chip.

A representative configuration of the present invention is an exposure head configured to expose a photosensitive drum, the exposure head including: a substrate; a plurality of strip-shaped semiconductor chips each including a plurality of light emitting elements that emit light and a drive circuit that drives the light emitting element, the plurality of semiconductor chips being arranged on the substrate; and a lens array configured to collect light from the light emitting elements on the photosensitive drum, in which the drive circuit operates between a first potential and a second potential, the light emitting element operates between a third potential and a fourth potential, and a potential difference between the third potential and the fourth potential is equal to or larger than a potential difference between the first potential and the second potential.

Further features of the present invention will become apparent from the following description of exemplary embodiments with reference to the attached drawings.

DESCRIPTION OF THE EMBODIMENTS

Figure 1:
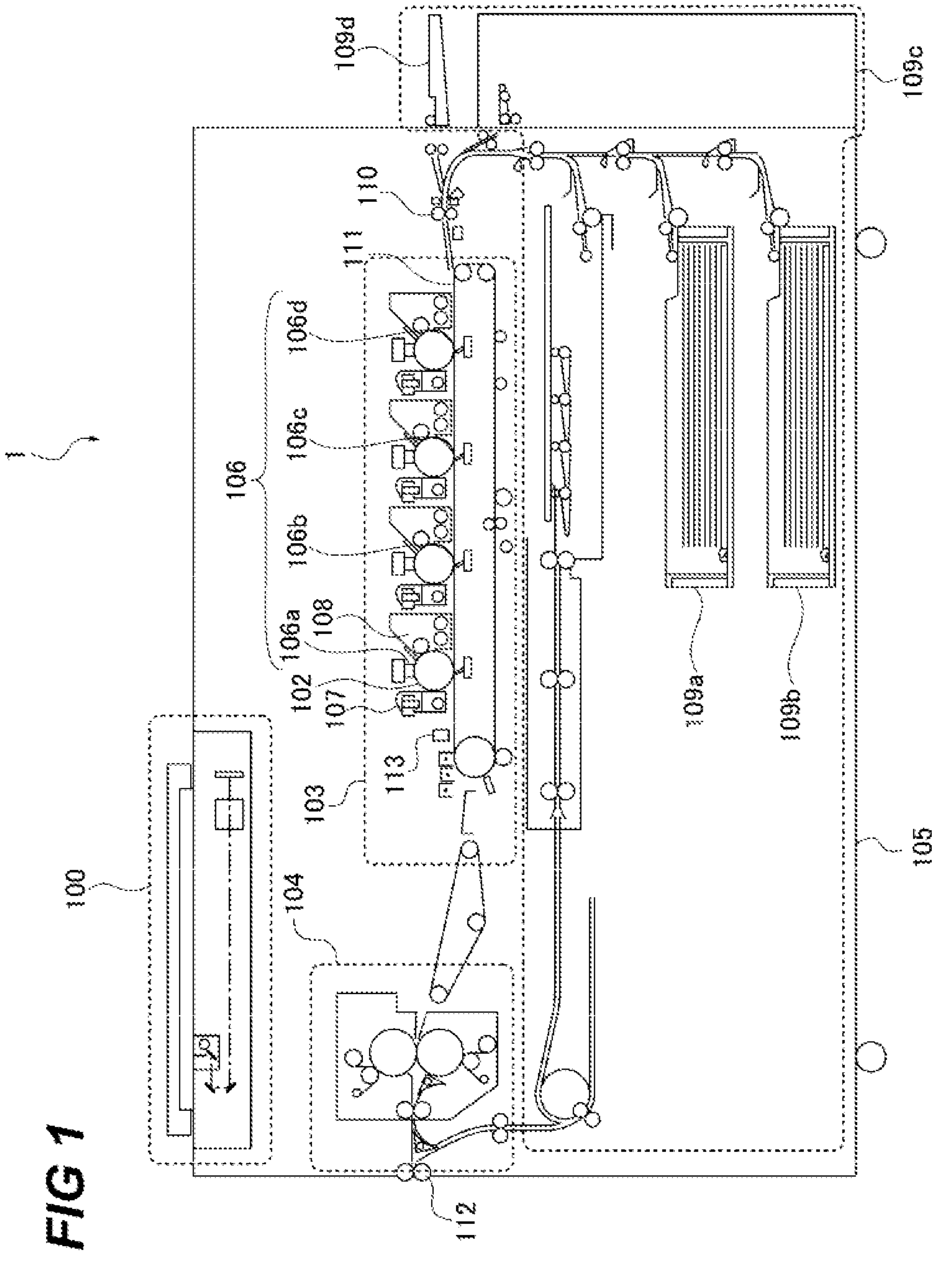
FIG. 1 is a schematic view of an image forming apparatus according to a first embodiment of the present invention.

Hereinafter, embodiments will be described in detail with reference to the drawings.

First Embodiment

<Configuration of Image Forming Apparatus>

A configuration of an image forming apparatus 1 according to a first embodiment of the present invention will be described in detail with reference to FIG. 1.

The image forming apparatus 1 includes a scanner portion 100, an image creating portion 103, a fixing portion 104, a feeding/conveying portion 105, and a registration roller 110.

The scanner portion 100 illuminates an original placed on an original base plate to optically read an image of the original, and converts the read image into an electrical signal to create image data. The scanner portion 100 outputs the created image data to a printer controller (not illustrated).

The image creating portion 103 operates under the control of the printer controller to form an image on a sheet conveyed from the registration roller 110 and convey the sheet on which the image is formed to the fixing portion 104. The image creating portion 103 includes four image creating units that perform a series of electrophotographic processes including charging, exposure, development, and transfer. The image creating portion 103 forms a full-color image on a sheet by four image creating units arranged in order of cyan (C), magenta (M), yellow (Y), and black (K). The four image creating units sequentially perform magenta, yellow, and black image creating operations after a predetermined time has elapsed from the start of cyan image creation.

Specifically, the image creating portion 103 includes photosensitive drums 102, exposure heads 106, chargers 107, development devices 108, a transfer belt 111, and an optical sensor 113.

The photosensitive drums 102 serving as image bearing members are attached to the image forming apparatus 1 by attachment members (not illustrated) and rotationally driven.

The exposure heads 106 are attached to the image forming apparatus 1 by attachment members (not illustrated). The exposure heads 106 include four exposure heads 106*a*, 106*b*, 106*c*, and 106*d* corresponding to the four image creating units. The exposure head 106 collects light emitted according to image data on the photosensitive drum 102 and performs exposure to form a latent image (electrostatic latent image) on the photosensitive drum 102. Note that details of the configuration of the exposure head 106 will be described below.

The charger 107 charges the photosensitive drum 102.

The development device 108 supplies toner to the latent image formed on the photosensitive drum 102 and develops the latent image to form a toner image (developer image) on the photosensitive drum 102.

The transfer belt 111 conveys a sheet conveyed from the registration roller 110 to the fixing portion 104. The toner image developed by the development device 108 is transferred to the sheet conveyed by the transfer belt 111.

The optical sensor 113 is provided at a position facing the transfer belt 111, and detects a position of a test chart printed on the transfer belt 111 in order to derive a color shift amount between the image creating units. The optical sensor 113 outputs a result of detection of the position of the test chart to an image controller portion (not illustrated). Based on the result of detection of the position of the test chart input from the optical sensor 113, the image controller portion performs control to derive the color shift amount between the image creating units of the image creating portion 103 and correct an image position of each color. A full-color toner image without color shift is transferred onto the sheet by the control.

The fixing portion 104 is implemented by a combination of rollers, and incorporates a heat source such as a halogen heater (not illustrated). The fixing portion 104 dissolves and fixes the toner on the sheet to which the toner image is transferred by the image creating portion 103 to the sheet by heat and pressure, and discharges the sheet to which the toner is fixed to the outside of the image forming apparatus 1 by a discharge roller 112.

The feeding/conveying portion 105 includes an in-body feeding unit 109*a*, an in-body feeding unit 109*b*, an external feeding unit 109*c*, and a manual feeding unit 109*d*, and feeds a sheet from a feeding unit indicated in advance and conveys the sheet to the registration roller 110.

The registration roller 110 conveys the sheet conveyed from the feeding/conveying portion 105 to the transfer belt 111 at a timing when the toner image formed in the image creating portion 103 is transferred onto the sheet.

The printer controller controls operations of the scanner portion 100, the image creating portion 103, the fixing portion 104, and the feeding/conveying portion 105. The printer controller communicates with an MFP controller that controls the entire MFP (the entire image forming apparatus 1), and controls the operations while managing the states of the scanner portion 100, the image creating portion 103, the fixing portion 104, and the feeding/conveying portion 105 according to an instruction of the MFP controller.

<Configuration of Exposure Head>

A configuration of the exposure head 106 according to the first embodiment of the present invention will be described in detail with reference to FIGS. 2 and 3.

Figure 2A:
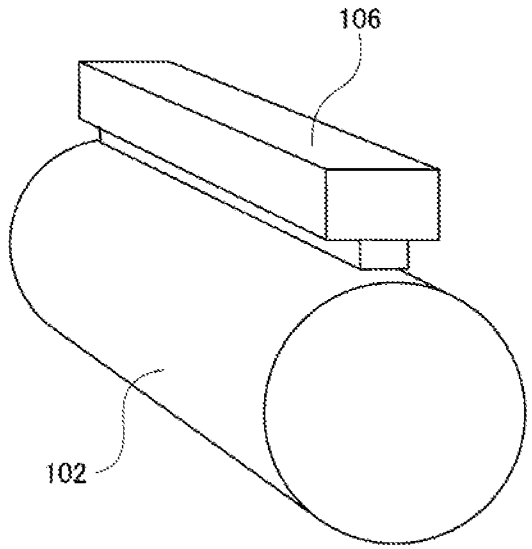
FIGS. 2(*a*) and 2(*b*) are schematic views of an exposure head and a photosensitive drum according to the first embodiment of the present invention.
Figure 2B:
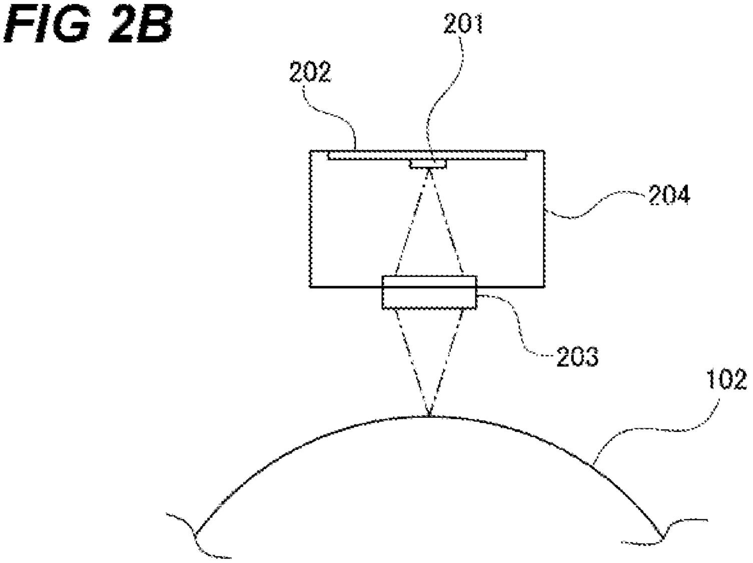

FIG. 2(*a*) illustrates arrangement of the exposure head 106 with respect to the photosensitive drum 102, and FIG. 2(*b*) illustrates a state in which light emitted from a light emitting element group 201 is collected on the photosensitive drum 102 by a rod lens array 203.

Figure 3A:
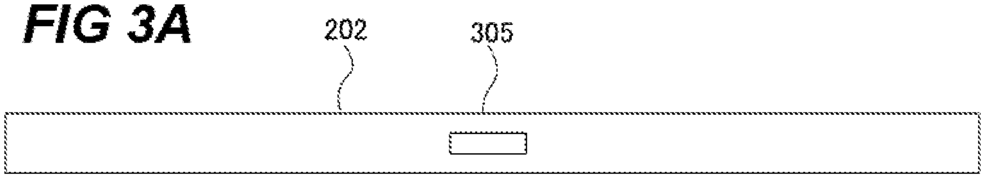
FIGS. 3(*a*), 3(*b*), and 3(*c*) are schematic views illustrating a configuration of an exposure head according to the first embodiment of the present invention.
Figure 3B:
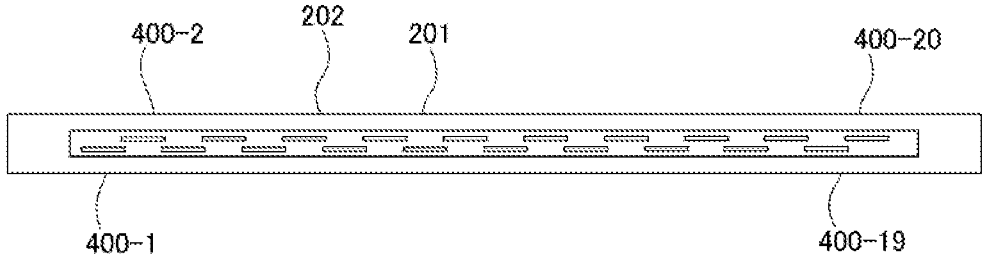
Figure 3C:
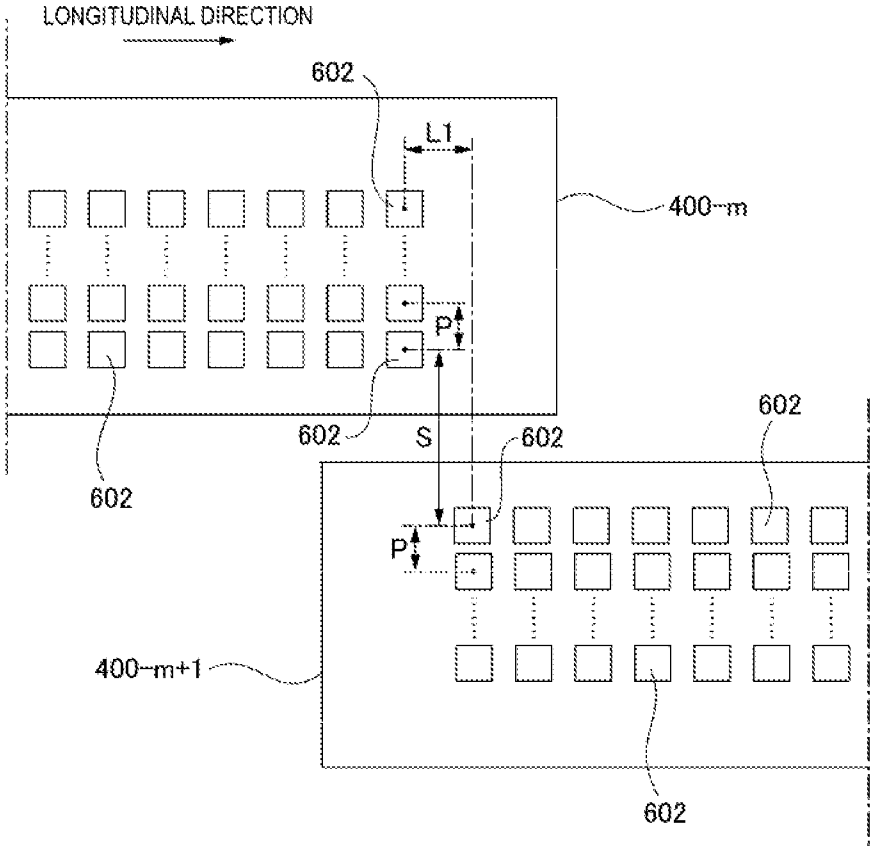

FIG. 3(*a*) illustrates a surface (hereinafter, referred to as a "non-light emitting element mounting surface") of a printed circuit board 202 opposite to a surface on which the light emitting element group 201 is mounted, and FIG. 3(*b*) illustrates the surface (hereinafter, referred to as a "light emitting element mounting surface") on which the light emitting element group 201 is mounted. Further, FIG. 3(*c*) illustrates a state of a boundary portion between light emitting element array chips 400-*m* (m is an integer of 1 or more and 19 or less) and 400-*m*+1.

The exposure head 106 includes the light emitting element group 201, the printed circuit board 202, the rod lens array 203, and a housing 204.

The light emitting element group 201 is mounted on the light emitting element mounting surface of the printed circuit board 202, and has a configuration in which 20 strip-shaped light emitting element array chips 400-1 to 400-20 are arranged in two rows in a staggered manner. The light emitting element array chips 400-1 to 400-20 of the respective rows are arranged along a longitudinal direction of the printed circuit board 202.

In the light emitting element array chips 400-1 to 400-20 serving as semiconductor chips, light emitting elements 602 are arranged at a predetermined pitch in the longitudinal direction (main scanning direction) and a lateral direction (sub-scanning direction) of the light emitting element array chips 400-1 to 400-20. In each of the light emitting element array chips 400-1 to 400-20, 748 light emitting elements 602 are arranged at a predetermined image resolution pitch in an X direction which is the longitudinal direction. Here, the image resolution pitch is 1200 dpi (approximately 21.16 μm). In addition, an end-to-end distance of the 748 light emitting elements 602 in each of the light emitting element array chips 400-1 to 400-20 is about 15.8 mm here as an example.

In the light emitting element group 201, as 20 light emitting element array chips 400-1 to 400-20 are arranged in the longitudinal direction, the number of light emitting elements that can be exposed is 14960, and image formation corresponding to an image width of about 316 mm becomes possible.

In this example, an image resolution pitch of a light emitting element 602-*n* and a light emitting element 602-1 positioned at a boundary between the light emitting element array chips 400-1 to 400-20 illustrated in FIG. 3(*c*) is also 1200 dpi (approximately 21.16 μm). In addition, an interval S between the light emitting element 602-*n* and the light emitting element 602-1 in the lateral direction is about 127 μm (six pixels at 1200 dpi and four pixels at 800 dpi). Further, an interval L between the light emitting element 602-*n* and the light emitting element 602-1 in the longitudinal direction is about 21.16 μm (one pixel at 1200 dpi). Note that the interval S and the interval L between the light emitting element 602-*n* and the light emitting element 602-1 are not limited to the above-described values.

As illustrated in FIG. 3(*a*), the printed circuit board 202 serving as a board is provided with a connector 305 and a driver IC (not illustrated) for driving the light emitting element group 201 on the non-light emitting element mounting surface. The light emitting element group 201 is mounted on the light emitting element mounting surface serving as a surface of the printed circuit board 202 as illustrated in FIG. 3(*b*).

The connector 305 is connected to the driver IC and a power supply (not illustrated) provided on the light emitting element non-mounting surface of the printed circuit board 202 via a signal line (not illustrated), and is also connected to the light emitting element group 201.

The rod lens array 203 is arranged in such a way that a distance from the light emitting element group 201 is a predetermined distance, is arranged in such a way that a distance from the photosensitive drum 102 is a predetermined distance, and forms an image of light emitted from the light emitting element group 201 on the photosensitive drum 102.

The rod lens array 203 and the printed circuit board 202 are attached to the housing 204.

The exposure head 106 having the above-described configuration is assembled alone in a factory, and focus adjustment and light quantity adjustment for adjusting a spot at a light collection position to a predetermined size are performed. Here, in the focus adjustment, an attachment position of the rod lens array 203 is adjusted in such a way that the distance between the rod lens array 203 and the light emitting element group 201 becomes a desired distance. In the light quantity adjustment, the respective light emitting elements 602 of the light emitting element group 201 are individually and sequentially caused to emit light, and a drive current for each light emitting element 602 is adjusted in such a way that light collected on the photosensitive drum 102 through the rod lens array 203 has a predetermined light quantity.

<Configuration of Light Emitting Element Array Chip>

Figure 4:
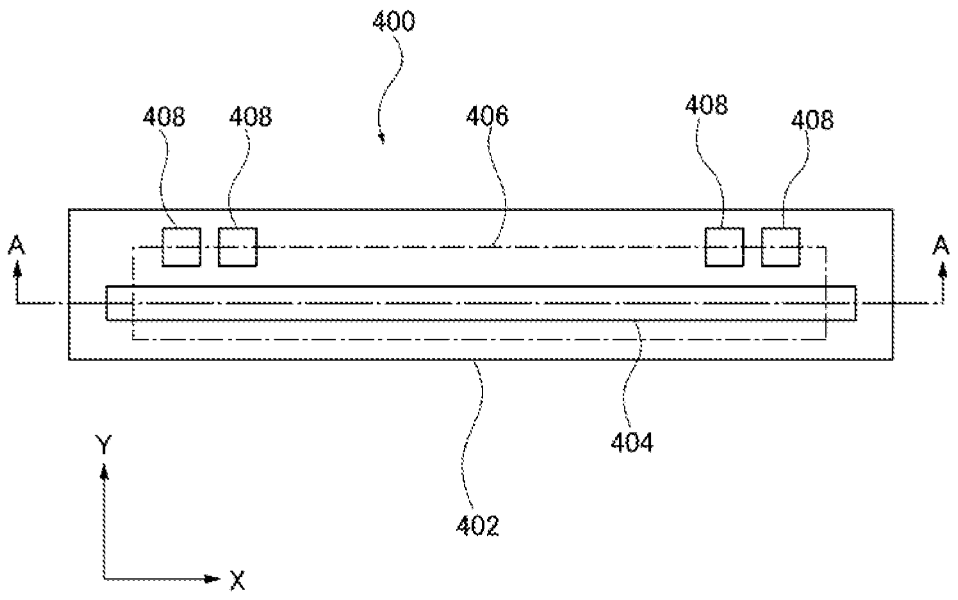
FIG. 4 is a schematic view of a light emitting element array chip of the exposure head according to the first embodiment of the present invention.

A configuration of the light emitting element array chips 400-1 to 400-20 of the exposure head 106 according to the first embodiment of the present invention will be described in detail with reference to FIG. 4.

The light emitting element array chip 400 is a chip configured by providing the light emitting elements 602 on a Si substrate, and includes a light emitting substrate 402, a light emitting portion 404, a circuit portion 406, and a wire bonding pad (WB pad) 408.

The light emitting substrate 402 is a Si substrate, and the light emitting portion 404 and the wire bonding pad 408 are provided on the light emitting substrate 402. The circuit portion 406 for controlling the light emitting portion 404 is built in the light emitting substrate 402. Here, with the development of a process technology for forming an integrated circuit, the Si substrate has already been used as a substrate of various integrated circuits, and thus, high-speed and highly functional circuits can be formed at a high density, and large-diameter wafers are available at low cost, which is advantageous.

The light emitting portion 404 includes the light emitting element 602. Note that details of the configuration of the light emitting portion 404 will be described below.

The circuit portion 406 has a circuit configuration including an analog drive circuit, a digital control circuit, or both an analog drive circuit and a digital drive circuit, and controls the light emitting portion 404.

The wire bonding pad 408 supplies power to the circuit portion 406 or performs input and output of a signal between the light emitting element array chip 400 and the outside.

<Configuration of Light Emitting Portion>

The configuration of the light emitting portion 404 of the light emitting element array chips 400-1 to 400-20 of the exposure head 106 according to the first embodiment of the present invention will be described in detail with reference to FIG. 5.

The light emitting portion 404 includes a portion where the light emitting substrate 402 and an upper electrode 508 face each other and a light emitting layer 506 in the facing portion, and is configured by stacking a plurality of lower electrodes 504, the light emitting layer 506, and the upper electrode 508 in this order on the light emitting substrate 402.

The lower electrode 504 is an independent electrode, and is formed on the light emitting substrate 402. The lower electrode 504 has a width W in the X direction, and a plurality of lower electrodes 504 adjacent to each other in the X direction are provided with a predetermined interval d therebetween. The lower electrode 504 is formed by using a Si integrated circuit processing technology in which a process rule is about 0.2 μm and high accuracy is obtained, together with the formation of the circuit portion 406, and is connected to a drive portion (not illustrated) of the circuit portion 406. As a result, the lower electrodes 504 can be arranged with high density and high accuracy, and a light emitting point of the light emitting element 602 is substantially the same as that of the lower electrode 504, and thus, the light emitting elements 602 can be arranged with high density.

The lower electrode 504 is preferably formed of a metal having a high reflectance with respect to a light emission wavelength of the light emitting layer 506, and is formed of silver (Ag), aluminum (Al), an alloy of silver and aluminum, or the like.

The light emitting layer 506 is formed on the lower electrodes 504, and is, for example, an organic EL film or an inorganic EL film. In a case where the light emitting layer 506 is an organic EL film, the light emitting layer 506 is a stacked structure including functional layers such as an electron transport layer, a hole transport layer, an electron injection layer, a hole injection layer, an electron blocking layer, and a hole blocking layer as necessary.

In a case where the light emitting layer 506 is formed of a material vulnerable to moisture such as an organic EL layer or an inorganic EL layer, it is desirable to perform sealing in order to prevent moisture from entering the light emitting portion 404. The light emitting layer 506 prevents moisture from entering the light emitting portion 404 by, for example, a single thin film of silicon oxide, silicon nitride, aluminum oxide, or the like or a sealing film formed by stacking thin films of silicon nitride, aluminum oxide, or the like. As a method for forming the sealing film, a method excellent in covering performance for a structure such as a step is preferable, and for example, an atomic layer deposition method (ALD method) or the like can be used.

The light emitting layer 506 may be continuously formed or may be divided in substantially the same size as the lower electrode 504. Further, the material, configuration, and forming method of the sealing film are merely examples, and are not limited to the examples described above, and it is sufficient if a suitable material, configuration, and forming method are appropriately selected.

The upper electrode 508 is a common electrode, and is formed on the light emitting layer 506. The upper electrode 508 is preferably transparent to the light emission wavelength of the light emitting layer 506, and a transparent electrode formed of indium tin oxide (ITO) can be used.

The light emitting portion 404 having the above-described configuration energizes the light emitting layer 506 through a selected lower electrode 504 among the plurality of lower electrodes 504 and the upper electrode 508, thereby causing the light emitting layer 506 at a location corresponding to the selected lower electrode 504 to emit light. As a result, the light emitting portion 404 emits the light through the upper electrode 508 positioned on a side of the light emitting layer 506 that is opposite to a side where the light emitting substrate 402 is positioned.

By using a transparent electrode formed of indium tin oxide or the like as the upper electrode 508, an opening ratio becomes substantially 100%, and light emitted from the light emitting layer 506 is emitted as it is. In addition, by forming the lower electrode 504 using the Si integrated circuit processing technology with high accuracy, the lower electrodes 504 can be arranged at high density, and thus, it is possible to cause substantially the entire area of the light emitting portion 404 to emit light, and it is possible to enhance utilization efficiency of the light emitting portion 404. Here, the area of the light emitting portion 404 is an area obtained by adding the total area of the plurality of lower electrodes 504 and the total area of a plurality of intervals d.

<Arrangement of Light Emitting Elements of Light Emitting Portion>

The arrangement of the light emitting elements 602 of the light emitting portion 404 of the exposure head 106 according to the first embodiment of the present invention will be described in detail with reference to FIGS. 6 to 8.

Figure 6A:
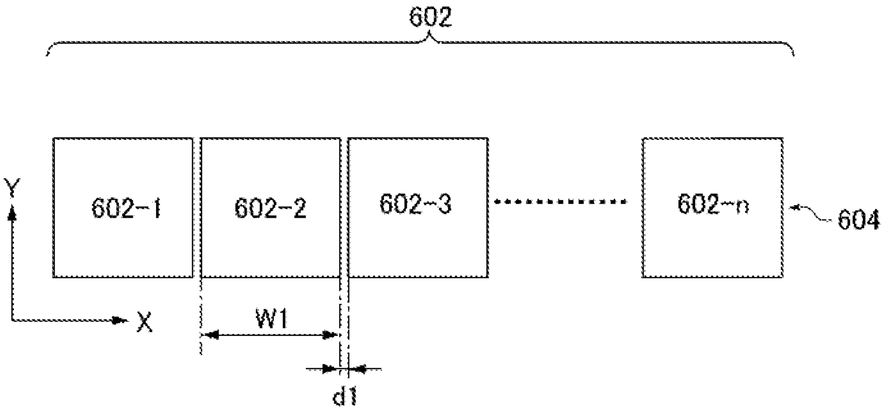
FIGS. 6(*a*) and 6(*b*) are schematic views illustrating arrangement of light emitting elements of the light emitting element array chip of the exposure head according to the first embodiment of the present invention.
Figure 6B:
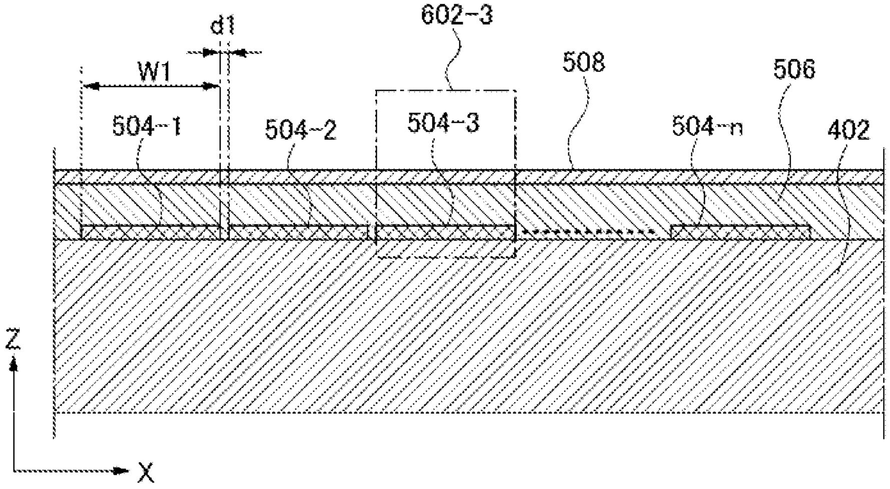

In FIG. 6, FIG. 6(*a*) illustrates an example in which the plurality of light emitting elements 602 are arranged in a row, and FIG. 6(*b*) is a schematic cross-sectional view of a light emitting element row 604. FIG. 7 illustrates an example in which the light emitting portion 404 is configured by arranging a plurality of light emitting element rows 604 in a Y direction of the drawing.

In FIGS. 6(*a*) and 6(*b*), W1 is a width of the light emitting element 602 in the X direction, and d1 is an interval between the light emitting elements 602 adjacent to each other in the X direction. In FIG. 7, W2 is a width of the light emitting element 602 in the Y direction, and d2 is an interval between the light emitting elements 602 adjacent to each other in the Y direction.

Furthermore, in FIG. 6(*b*), for example, a light emitting element 602-3 is a portion surrounded by a line with alternating long and short dashes.

The light emitting element row 604 is configured by arranging a plurality of light emitting elements 602 at a predetermined interval (pitch) in the X direction. The predetermined interval is, for example, 21 μm or 16 μm in a case where an image resolution in the Y direction is 1200 dpi. W1 is 19.8 μm as an example, and d1 is 0.68 μm as an example.

Figure 5:
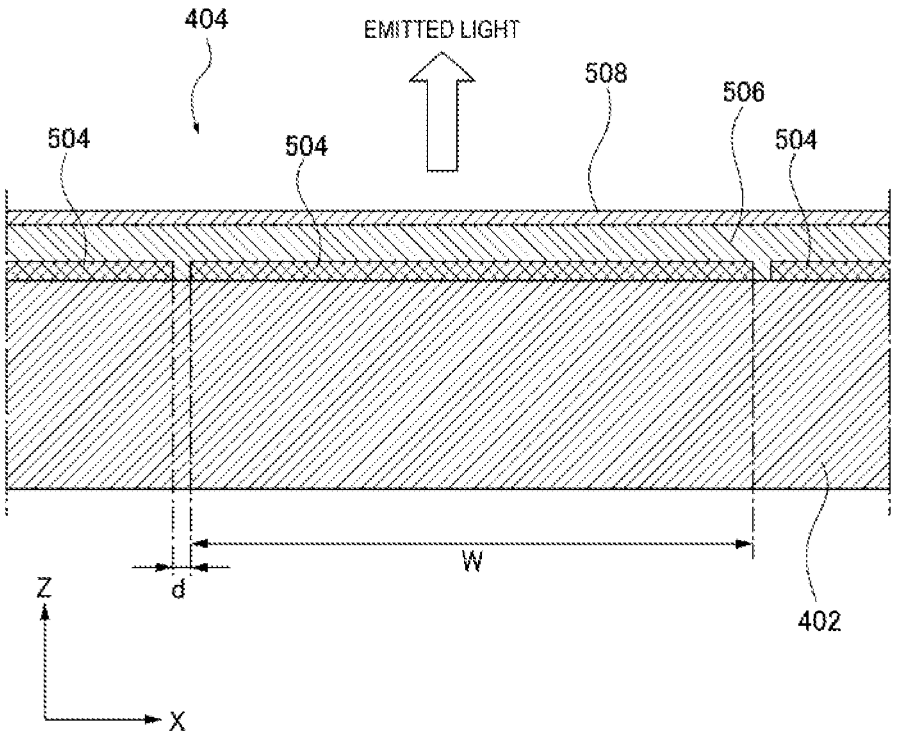
FIG. 5 is a cross-sectional view taken along line A-A of FIG. 4.

Here, in a case where the light emitting layer 506 is sufficiently thin, a light emitting point of the light emitting element 602 is substantially the same as that of the lower electrode 504, and W1 may be regarded as W of FIG. 5, and d1 may be regarded as d of FIG. 5.

Figure 7:
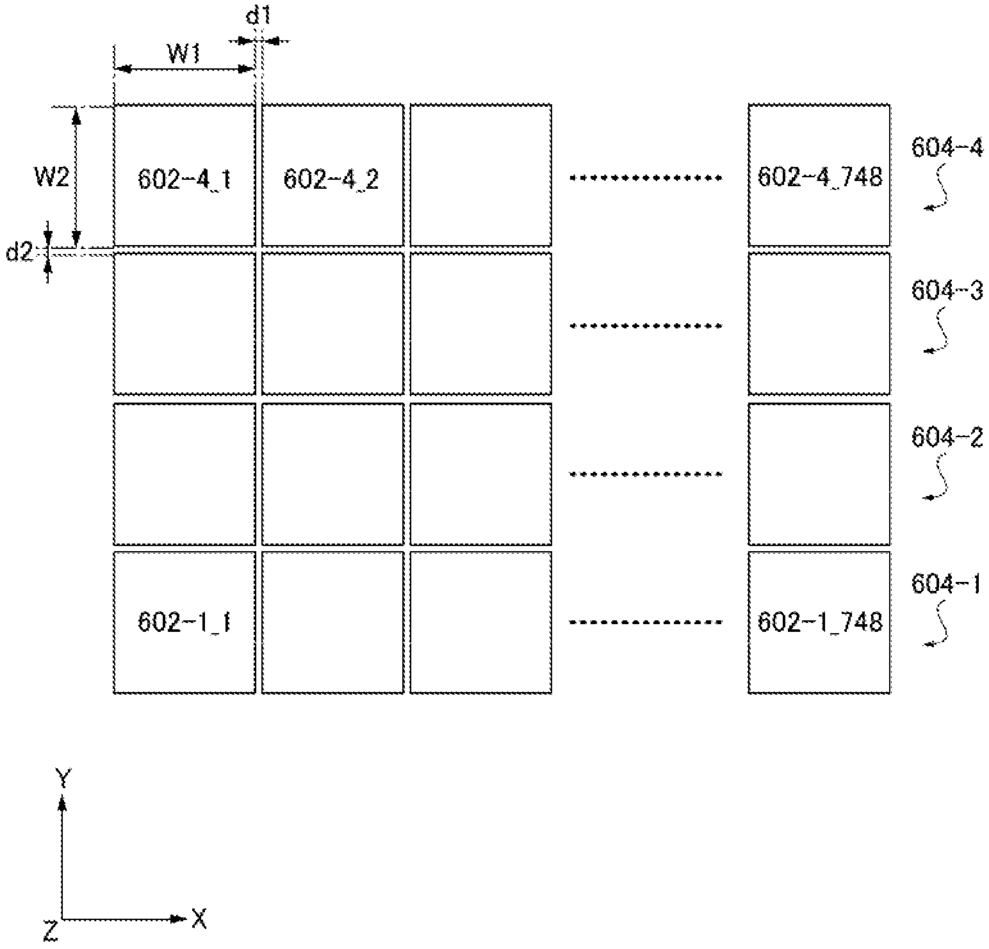
FIG. 7 is a schematic view illustrating a modification of the arrangement of the light emitting elements of the light emitting element array chip of the exposure head according to the first embodiment of the present invention.
Figure 8:
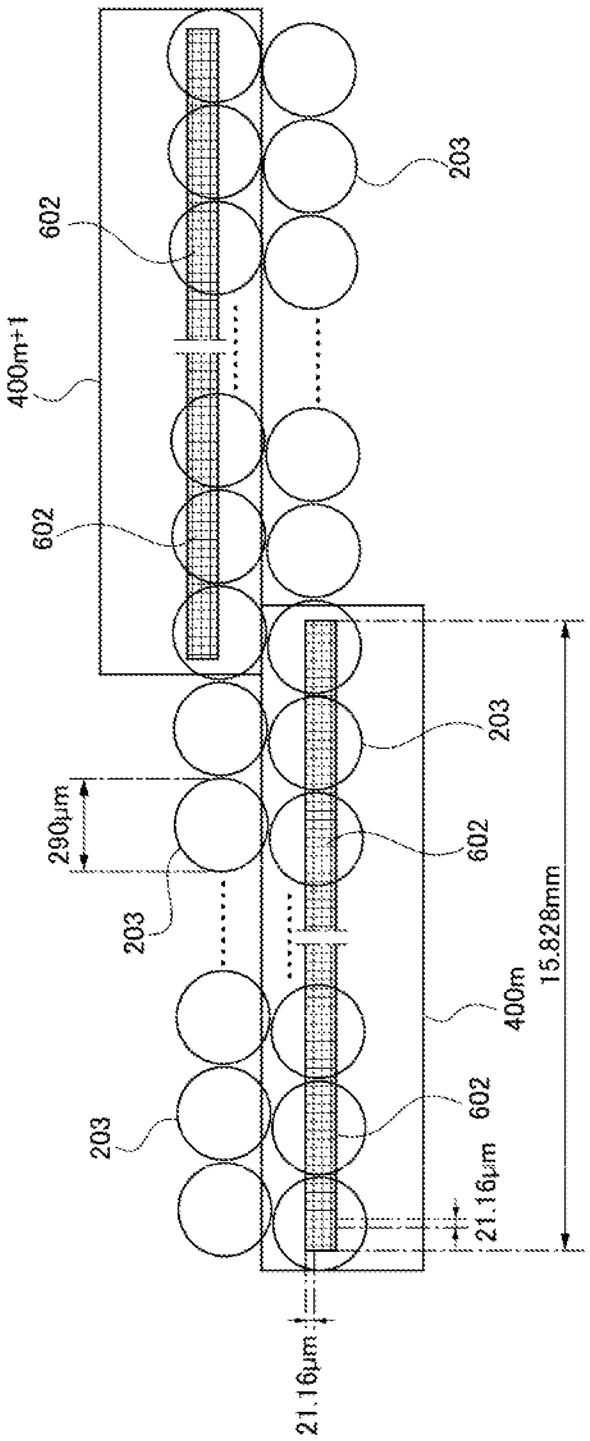
FIG. 8 is a plan view illustrating a positional relationship between a light emitting portion and a rod lens of the exposure head according to the first embodiment of the present invention.

The light emitting element row 604 is not limited to a case where the light emitting elements 602 are arranged in one row in the X direction as illustrated in FIG. 6(*a*), and the light emitting elements 602 may be arranged in a plurality of rows also in the Y direction as illustrated in FIG. 7. FIG. 7 illustrates a case where 748 light emitting elements 602

(602-1 to 4_1 to 748) are arranged in the X direction, and four rows (604-1 to 604-4) are arranged in the Y direction different from the X direction on a matrix. Here, W2 is 19.8 μm which is the same as W1. Here, d2 is 0.68 μm which is the same as d1, and a case where the light emitting elements 602 are arranged at a pitch of 21.16 μm (1200 dpi) in the Y direction is exemplified.

The rod lens array 203 collects light emitted from the light emitting element group 201 on the photosensitive drum 102. Here, the number of light emitting element rows 604 in the Y direction is four, for example. Here, the pitch of the light emitting elements 602 in the X direction is 21.16 μm as illustrated in FIG. 8. Here, the pitch of the light emitting elements 602 in the Y direction is 21.16 μm as illustrated in FIG. 8. Here, a diameter of the rod lens array 203 is 290 μm as illustrated in FIG. 8. In this example, one rod lens array 203 is configured to collect light emitted from the plurality of light emitting elements 602.

<Circuit Configuration of Exposure Head>

A circuit configuration of the exposure head 106 according to the first embodiment of the present invention will be described in detail with reference to FIG.

In the description using FIG. 9, a circuit configuration of one exposure head 106 of a single color will be described in order to simplify the description, but actually, each of the four exposure heads 106 of four colors has the same circuit configuration. These four exposure heads 106 simultaneously execute parallel processing.

The exposure head 106 includes an image controller portion 700 that transmits a signal or data for controlling the printed circuit board 202 to the printed circuit board 202 and executes processing on image data and processing on an exposure timing. The signal and data transmitted from the image controller portion 700 to the printed circuit board 202 include a clock signal, image data, a signal indicating start of taking-in of image data (hereinafter, referred to as a "line synchronization signal"), and a communication signal.

Specifically, the image controller portion 700 includes an image data generation portion 701, a chip data conversion portion 702, a CPU 703, a synchronization signal generation portion 704, a +5 V generation circuit 710, a −5 V generation circuit 711, and a switch (SW) 714.

Here, the image controller portion 700 and the printed circuit board 202 are connected by a clock signal line 705, a line synchronization signal line 706, an image data signal line 707, a communication signal line 708, a +5 V power line 712, and a −5 V power line 713.

The clock signal line 705 connects the chip data conversion portion 702 and each of the light emitting element array chips 400-1 to 400-20.

The line synchronization signal line 706 connects the chip data conversion portion 702 and only the light emitting element array chip 400-1.

The image data signal line 707 connects the chip data conversion portion 702 and each of the light emitting element array chips 400-1 to 400-20. Here, the number of image data signal lines 707 is four, which is the same as the number of light emitting element rows 604.

The communication signal line 708 connects the CPU 703 and each of the light emitting element array chips 400-1 to 400-20.

The +5 V power line 712 connects the +5 V generation circuit 710 and each of the light emitting element array chips 400-1 to 400-20.

The −5 V power line 713 connects the switch (SW) 714 and each of the light emitting element array chips 400-1 to 400-20.

The image data generation portion 701 executes dithering processing on the image data input from the scanner portion 100 or received and input from the outside of the image forming apparatus 1 at an image resolution indicated by the CPU 703 to generate image data for print output. The image data generation portion 701 generates image data of one line×four rows (the number of light emitting element rows) by executing the dithering processing at an image resolution of 1200 dpi in each of the main scanning direction and the sub-scanning direction, for example. The image data generation portion 701 outputs the generated image data to the chip data conversion portion 702.

The chip data conversion portion 702 divides the image data input from the image data generation portion 701 for each of the light emitting element array chips 400-1 to 400-20 in synchronization with the line synchronization signal input from the synchronization signal generation portion 704. The chip data conversion portion 702 outputs the divided image data to each of the light emitting element array chips 400-1 to 400-20 via the image data signal line 707. At the same time, the chip data conversion portion 702 outputs the line synchronization signal to the light emitting element array chip 400-1 via the line synchronization signal line 706, and outputs the clock signal to the light emitting element array chips 400-1 to 400-20 via the clock signal line 705.

The CPU 703 sets, as one line cycle, a cycle in which the surface of the photosensitive drum 102 moves by a predetermined pixel size in the rotation direction at a predetermined rotation speed of the photosensitive drum 102, and indicates, to the synchronization signal generation portion 704, a time interval of a signal cycle.

For example, the CPU 703 sets, as one line cycle, a cycle in which the surface of the photosensitive drum 102 moves by a pixel size of 1200 dpi (about 21.16 μm) in the rotation direction at the predetermined rotation speed of the photosensitive drum 102. Then, for example, in a case where exposure is performed at a speed of 200 mm/sec in a conveyance direction, the CPU 703 sets one line cycle to 105.8 μsec (rounded down to one decimal place) and indicates, to the synchronization signal generation portion 704, the time interval of the signal cycle. At this time, the CPU 703 calculates the speed in the conveyance direction by using a set value (fixed value) of a printing speed set in a speed controller (not illustrated) that controls the speed of the photosensitive drum 102.

The CPU 703 indicates the image resolution to the image data generation portion 701. The CPU 703 outputs a power control signal to the switch 714 to turn on the switch 714. The CPU 703 transmits and receives the communication signal to and from each of the light emitting element array chips 400-1 to 400-20 via the communication signal line 708. The CPU 703 sets a set value in the communication signal based on head information and the like to be described below stored in a head information storage portion 709, and outputs the communication signal in which the set value is set to the light emitting element array chips 400-1 to 400-20 via the communication signal line 708.

The synchronization signal generation portion 704 generates the line synchronization signal based on the time interval of the signal cycle indicated by the CPU 703, and outputs the generated line synchronization signal to the chip data conversion portion 702.

The +5 V generation circuit 710 converts a power supply voltage of +12 V applied from a +12 V power supply into a voltage of +5 V and supplies the voltage to each of the light emitting element array chips 400-1 to 400-20 via the +5 V power line 712. As the +5 V generation circuit 710, a general switching regulator circuit can be applied.

The −5 V generation circuit 711 converts a power supply voltage of +12 V applied from the +12 V power supply into a voltage of −5 V and supplies the voltage to the switch 714. As the −5 V generation circuit 711, a general switching regulator circuit can be applied.

The switch 714 serving as a switching element is turned on or off according to whether or not the power control signal is input from the CPU 703, thereby switching whether or not to supply a voltage of −5 V to the light emitting element array chip 400. The switch 714 is turned on when the power control signal is input from the CPU 703, and supplies a voltage of −5 V to each of the light emitting element array chips 400-1 to 400-20 via the −5 V power line 713. The −5 V power line 713 is in a floating state in a case where the switch 714 is turned off and a voltage of −5 V is not supplied to the light emitting element array chips 400-1 to 400-20.

The printed circuit board 202 includes the light emitting element array chips 400-1 to 400-20 and the head information storage portion 709.

The light emitting element array chip 400-1 and the light emitting element array chip 400-2 are connected by a signal line 708-1. The light emitting element array chip 400-2 and the light emitting element array chip 400-3 are connected by a signal line 708-2. Similarly, the light emitting element array chip 400-3 and subsequent light emitting element array chips are connected one after another by a signal line 708-3 and subsequent signal lines.

Each of the light emitting element array chips 400-1 to 400-20 generates a line synchronization signal for the next chip based on the input line synchronization signal, and outputs the line synchronization signal to the next light emitting element array chips 400-1 to 400-20 via the signal line 708-1 and subsequent signal lines. Each of the light emitting element array chips 400-1 to 400-20 causes the light emitting elements 602 to emit light based on the input clock signal, the line synchronization signal, the image data, and the set value set in the communication signal.

The head information storage portion 709 is connected to the CPU 703 via the communication signal line 708. The head information storage portion 709 is a storage device that stores head information such as light emission quantities and mounting position information of the light emitting element array chips 400-1 to 400-20.

<Circuit Configuration of Light Emitting Element Array Chip>

Circuit configurations of the light emitting element array chips 400-1 to 400-20 of the exposure head 106 according to the first embodiment of the present invention will be described in detail with reference to FIGS. 10 to 13.

Since the circuit configurations of the light emitting element array chips 400-1 to 400-20 are the same, the circuit configuration of the light emitting element array chip 400-1 will be described, and the description of the circuit configurations of the light emitting element array chips 400-2 to 400-20 is omitted. Furthermore, since the clock signal is input to all blocks of a digital portion 800, the clock signal line 705 is connected to all the blocks of the digital portion 800, but the description thereof is omitted in FIG. 10.

The light emitting element array chip 400-1 includes the light emitting portion 404 and the circuit portion 406. The circuit portion 406 includes the digital portion 800 and an analog portion 801.

The clock signal, the image data signal, and the line synchronization signal are input to the digital portion 800 from the chip data conversion portion 702, and the communication signal is input to the digital portion 800 from the CPU 703. The digital portion 800 generates a drive signal (pulse signal) for causing the light emitting element 602 to emit light based on the set value set in the communication signal, the image data signal, and the line synchronization signal in synchronization with the clock signal, and outputs the generated drive signal to the analog portion 801. The digital portion 800 generates a line synchronization signal for the next chip based on the line synchronization signal, and outputs the generated line synchronization signal for the next chip to the light emitting element array chip 400-2 which is the next chip via the signal line 708-1.

Specifically, the digital portion 800 includes a communication IF portion 802, a register portion 803, a line synchronization signal generation portion 804, a taking-in signal generation portion 805, and data holding portions 806-001 to 806-748.

The communication IF portion 802 is connected to the CPU 703 via the communication signal line 708.

The set value set in the communication signal input from the CPU 703 via the communication IF portion 802 is written in the register portion 803. The register portion 803 reads the set value written by the CPU 703, outputs the read set value to the analog portion 801 as drive current information, and outputs the read set value to the taking-in signal generation portion 805 as delay time information. Here, the drive current information is information regarding a set current value of the drive current flowing through the light emitting portion 404, and is a digital value. Further, the delay time information is information regarding a delay time by which output of a data latch signal is to be delayed, and is a digital value.

The line synchronization signal generation portion 804 delays the line synchronization signal input from the line synchronization signal line 706 by a predetermined time, generates a line synchronization signal for the next chip, and outputs the line synchronization signal to the light emitting element array chip 400-2 via the signal line 708-1.

The taking-in signal generation portion 805 outputs a data latch signal we001 to the data holding portion 806-001 at a timing delayed by the delay time in the delay time information input from the register portion 803 based on the line synchronization signal input via the line synchronization signal line 706.

A clock signal and a data latch signal wen (n=1 to 748) are input to each of the data holding portions 806-001 to 806-748, and pieces of image data 1 to 4 for four rows are input at a timing when the data latch signal wen is input.

Figure 11:
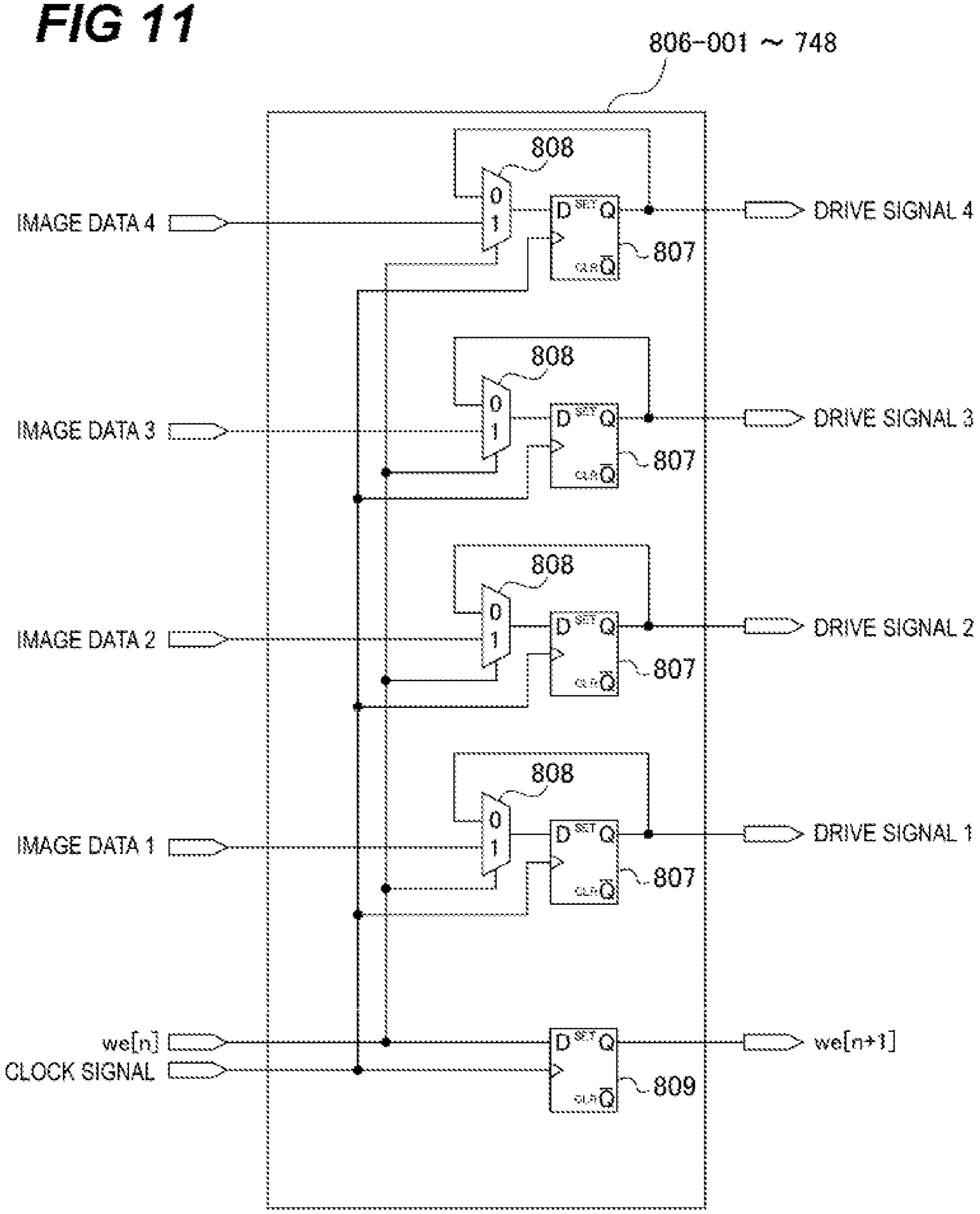
FIG. 11 is a circuit configuration diagram of a data holding portion of the light emitting element array chip of the exposure head according to the first embodiment of the present invention.

As illustrated in FIG. 11, the data holding portions 806-001 to 806-748 each include four flip-flop circuits 807 and four gate circuits 808 that latch the pieces of input image data 1 to 4, generate drive signals 1 to 4, and output the drive signals to the analog portion 801. The data holding portions 806-001 to 806-748 each include one flip-flop circuit 809 that delays the input data latch signal wen by one clock and outputs the delayed data latch signal we(n+1) to the next data holding portions 806-001 to 806-748.

The analog portion 801 controls driving of the light emitting portion 404 based on the drive current information input from the register portion 803 and the drive signals input from the data holding portions 806-001 to 806-748.

Figure 12:
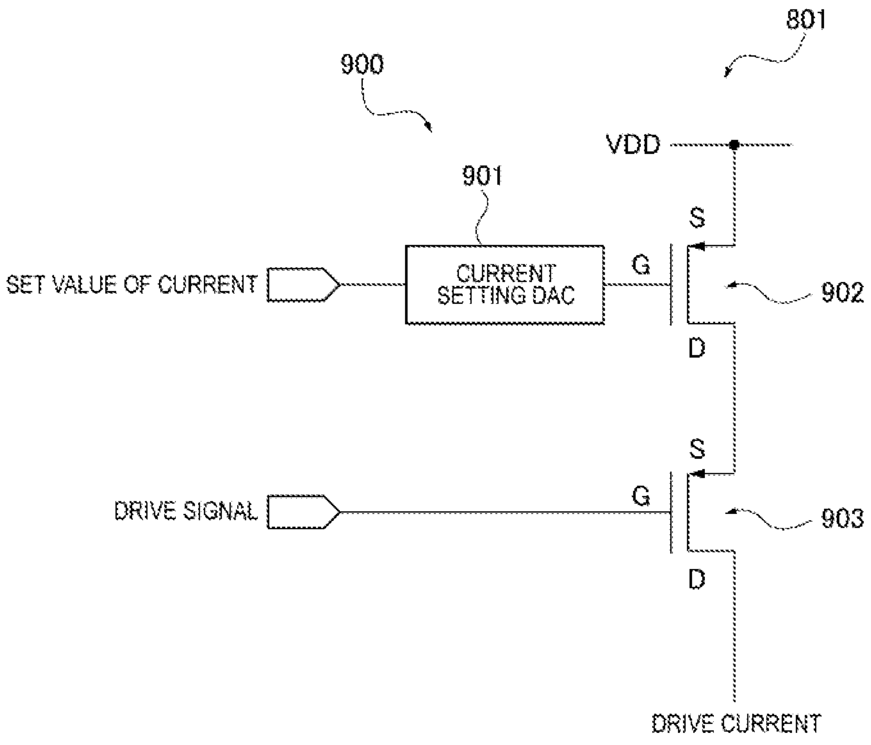
FIG. 12 is a block diagram illustrating a configuration of an analog portion of the exposure head according to the first embodiment of the present invention.

Specifically, as illustrated in FIG. 12, the analog portion 801 includes a drive circuit 900 including a current setting DAC 901, a current control MOSFET 902, and a switching MOSFET 903.

The drive circuit 900 is connected to the light emitting element 602 on a one-to-one basis, and the number of provided drive circuits 900 is the same as the number of light emitting elements 602. In the present embodiment, 2992 drive circuits 900 (=748×4 rows) are provided for one of the light emitting element array chips 400-1 to 400-20. Since all the drive circuits 900 have the same configuration, only the configuration of one drive circuit 900 will be described in order to simplify the description.

The current setting DAC 901 converts the digital value of the drive current flowing through the light emitting portion 404 indicated by the drive current information input from the register portion 803 of the digital portion 800 into an analog voltage and outputs the analog voltage to a gate terminal G of the current control MOSFET 902.

The current control MOSFET 902 is a Pch MOSFET, and has a source terminal S connected to a power supply voltage VDD, a gate terminal G connected to an output terminal of the DAC 901, and a drain terminal D connected to a source terminal S of the switching MOSFET 903. The current control MOSFET 902 is configured in such a way that the drive current for the light emitting element 602 flowing from the source terminal S to the drain terminal D increases as the analog voltage input from the current setting DAC 901 increases.

The switching MOSFET 903 is a Pch MOSFET. The switching MOSFET 903 has the source terminal S connected to the drain terminal D of the current control MOSFET 902, a gate terminal G connected to an output terminal of the data holding portion 806, and a drain terminal D connected to an anode terminal A of the light emitting element 602 of the light emitting portion 404. The binary drive signals 1 to 4 indicating a high level or a low level are input from the data holding portions 806-001 to 806-748 to the gate terminal G of the switching MOSFET 903.

The switching MOSFET 903 is turned on when a high-level drive signal is input to the gate terminal G, and is turned off when a low-level drive signal is input to the gate terminal G. When a high-level drive signal is input to the gate terminal G and the switching MOSFET 903 is turned on, a current that becomes the drive current for the light emitting element 602 controlled by the current control MOSFET 902 flows from the source terminal S toward the drain terminal D.

Next, a power supply configuration for each of the digital portion 800, the analog portion 801, and the light emitting element 602 will be described in detail with reference to FIG. 13.

Figure 13:
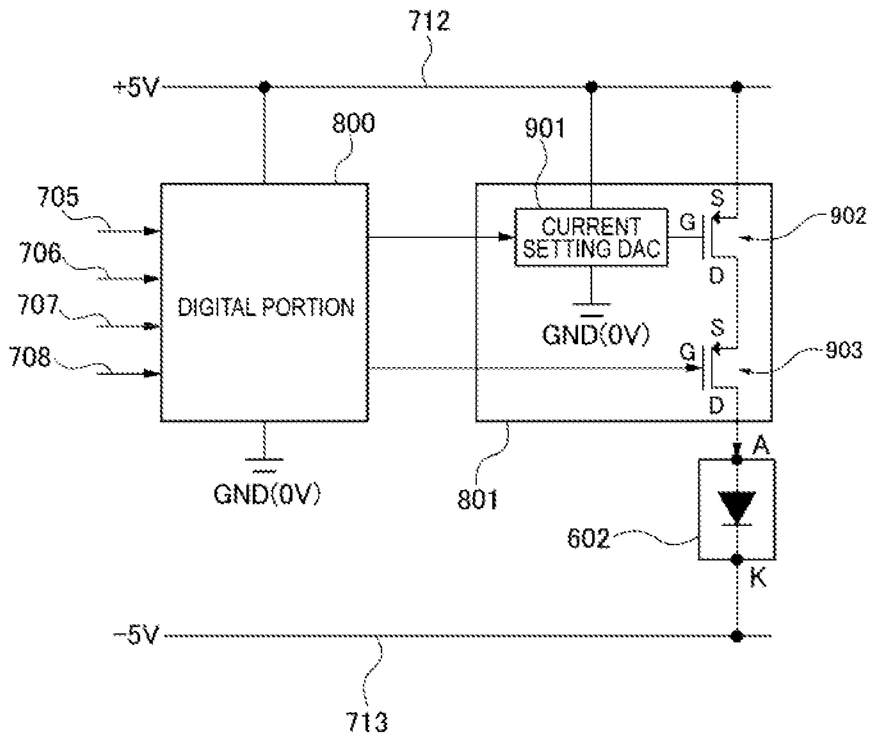
FIG. 13 is a block diagram illustrating a configuration of a power supply portion for the exposure head according to the first embodiment of the present invention.

In FIG. 13, in order to simplify the description, the description of blocks inside the digital portion 800 is omitted, and only one drive circuit 900 and one light emitting element 602 in the analog portion 801 are described.

A voltage of +5 V is supplied from the +5 V power line 712 to the digital portion 800 as the power supply voltage. The digital portion 800 is connected to a GND (0 V) as a reference potential. Thus, each block of the digital portion 800 operates at voltages of +5 V and 0 V. A voltage in a range of 0 V to 5 V is applied to the gate terminal of the switching MOSFET 903.

A voltage of +5 V is supplied from the +5 V power line 712 to the current setting DAC 901 of the analog portion 801 as the power supply voltage. The current setting DAC 901 is connected to a GND (0 V) as a reference potential. As a result, a voltage in a range of 0 V to 5 V is applied to the gate terminal of the current control MOSFET 902. A voltage of +5 V is supplied from the +5 V power line 712 to the source terminal of the current control MOSFET 902 as the power supply voltage.

The light emitting element 602 is, for example, an organic EL, and has the anode terminal A connected to the drain terminal of the switching MOSFET 903 and a cathode terminal K connected to the −5 V power line 713. A voltage of −5 V is supplied from the −5 V power line 713 to the cathode terminal K of the light emitting element 602. In the light emitting element 602, a forward voltage of about 6 V is generally generated by a drive current of several μA. In this case, a potential of the anode terminal A of the light emitting element 602 is about +1 V obtained by adding +6 V to −5 V.

Since a drain-source voltage of the current control MOSFET 902 and the switching MOSFET 903 is about 1.5 V, a voltage of about 9 V is obtained by adding the drain-source voltage of 1.5 V×2=3 V to the forward voltage of 6 V of the light emitting element 602. Therefore, the light emitting element array chips 400-1 to 400-20 require a voltage of about 9 V or more in order to cause the light emitting elements 602 to emit light. Since the light emitting element array chips 400-1 to 400-20 can drive the light emitting elements 602 in a 10 V range of +5 V and −5 V, the light emitting elements 602 can emit light.

Hitherto, in a configuration in which an EL film is stacked on the circuit portion by deposition or the like, it is necessary to form the light emitting element array chip by using a semiconductor process of 9 V or more in consideration of a drain-source voltage of the MOSFET in order to secure the forward voltage of 6 V of the light emitting element. On the other hand, in the present embodiment, +5 V and −5 V are supplied as the power supply voltages to drive the light emitting elements 602 in the 10 V range, and the digital portion 800 and the analog portion 801 are configured by a semiconductor process of +5 V from the GND. As a result, in the present embodiment, the sizes of the current control MOSFET 902 and the switching MOSFET 903 can be reduced, and the chip sizes of the light emitting element array chips 400-1 to 400-20 can be reduced.

<Operation of Exposure Head>

Figure 14:
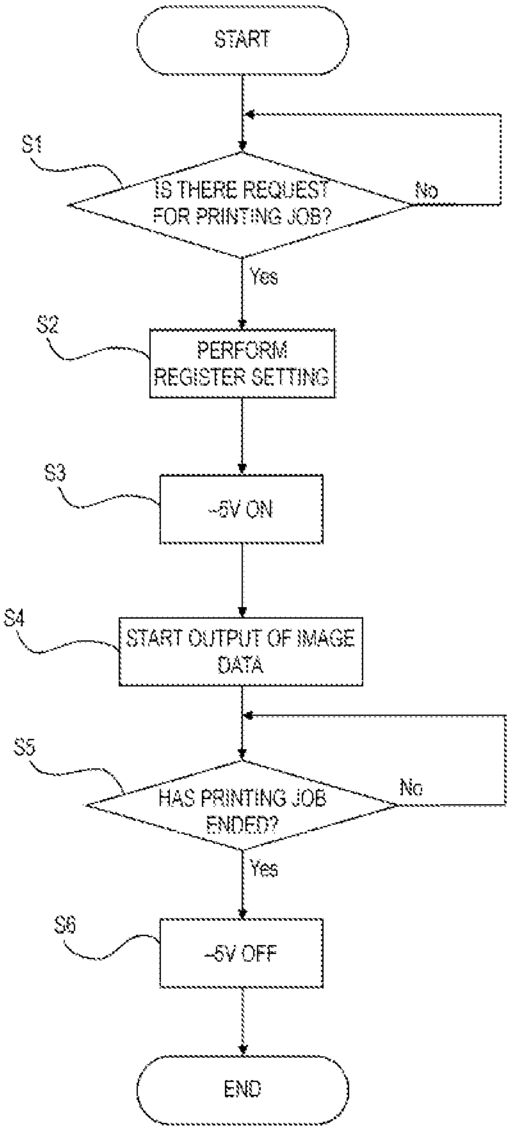
FIG. 14 is a flowchart of an operation of the exposure head according to the first embodiment of the present invention.

An operation of the exposure head 106 according to the first embodiment of the present invention will be described in detail with reference to FIGS. 14 and 15.

The exposure head 106 starts to operate at a timing when a main power supply of the image forming apparatus 1 is turned on.

First, the CPU 703 determines whether or not there is a request for a printing job from a user (S1).

In a case where there is no request for a printing job from the user (S1: No), the CPU 703 repeats the operation of step S1.

On the other hand, in a case where there is a request for a printing job from the user (S1: Yes), the CPU 703 writes a set value in the register portions 803 of the light emitting element array chips 400-1 to 400-20 to perform register setting (S2).

Next, the CPU 703 outputs the power control signal to the switch 714 to supply a voltage of −5 V to the cathode electrodes of the light emitting elements 602 of the light emitting element array chips 400-1 to 400-20 (−5 V ON) (S3).

Next, the CPU 703 starts outputting image data to the light emitting element array chips 400-1 to 400-20 at a predetermined timing to expose the photosensitive drum 102 (S4).

Next, the CPU 703 determines whether or not the printing job has ended (S5).

In a case where the printing job has not ended (S5: No), the CPU 703 repeats the operation of step S5.

On the other hand, in a case where the printing job has ended (S5: Yes), the CPU 703 stops transmitting the power control signal to the switch 714, thereby bringing a potential of the cathode electrode of the light emitting element 602 into a floating state, and ending the operation.

Next, the operation of the exposure head 106 will be described in more detail with reference to FIG. 15.

Figure 15:
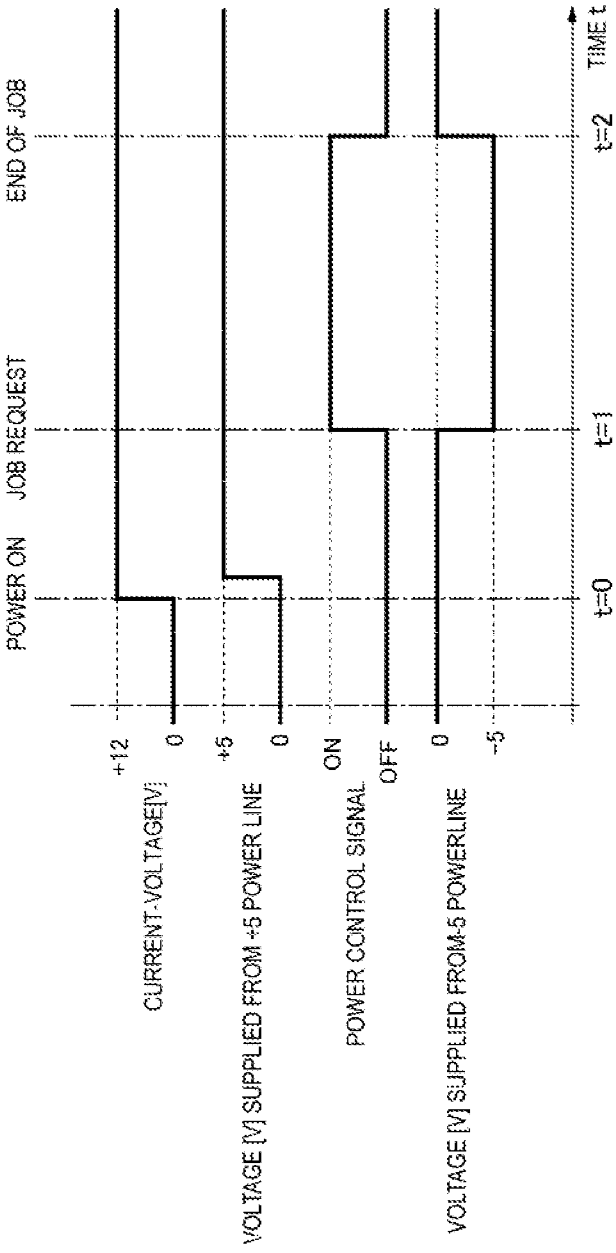
FIG. 15 is a timing chart of a power supply voltage supplied to the light emitting element array chip of the exposure head according to the first embodiment of the present invention.

Referring to FIG. 15, at time t=t0, the power supply of the image forming apparatus 1 is turned on, and a power supply voltage of +12 V is supplied to the +5 V generation circuit 710 and the −5 V generation circuit 711. As a result, a voltage of the +5 V power line 712 becomes +5 V after time t=t1. At this time, since the switch 714 is turned off, the −5 V power line 713 is in a floating state (0 V in FIG. 15).

At time t=t1, as a job request is received from the user, the CPU 703 outputs the power control signal to the switch 714, whereby a potential of the −5 V power line 713 becomes −5 V, and the light emitting element 602 can be driven.

At time t=t2, as the job ends, the CPU 703 stops outputting the power control signal to the switch 714 to turn off the switch 714, thereby making the −5 V power line 713 be in a floating state (0 V in FIG. 15).

<Operation of Light Emitting Element Array Chip>

Figure 16:
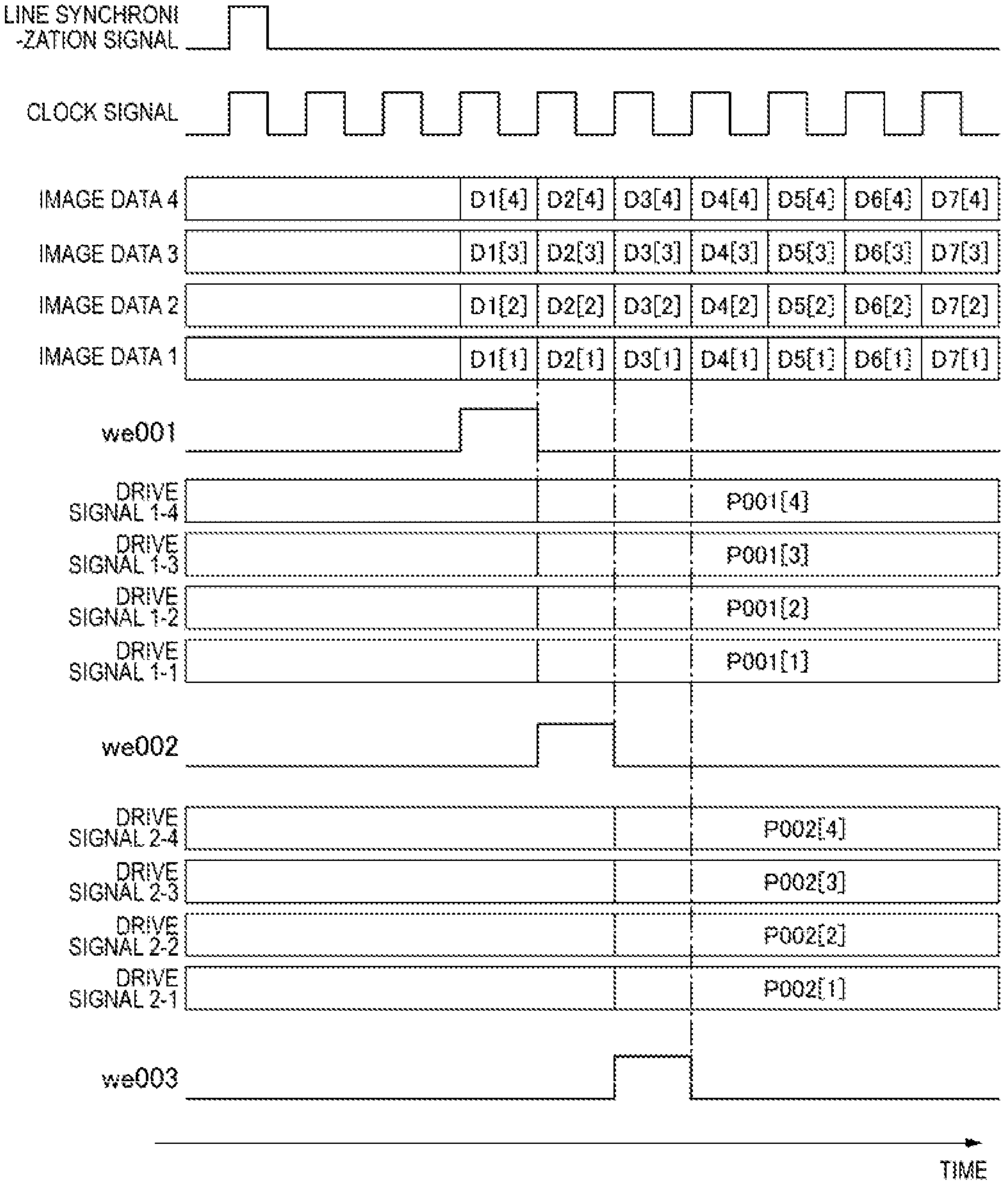
FIG. 16 is a timing chart of the light emitting element array chip of the exposure head according to the first embodiment of the present invention.

An operation of the light emitting element array chips 400-1 to 400-20 of the exposure head 106 according to the first embodiment of the present invention will be described in detail with reference to FIG. 16.

Pieces of image data (D1[1] to D1[4]) for four rows are simultaneously input to the data holding portion 806-001. The data holding portion 806-001 latches the pieces of image data (D1[1] to D1[4]) at a timing when the data latch signal we001 is input from the taking-in signal generation portion 805, and generates drive signals (P001[1] to P001 [4]).

In addition, the data holding portion 806-001 outputs a data latch signal we002 obtained by delaying the input data latch signal we001 by one clock to the next data holding portion 806-002.

Similarly to the data holding portion 806-001, pieces of image data (D2[1] to D2[4]) for four rows are simultaneously input to the data holding portion 806-002. The data holding portion 806-002 latches the pieces of image data (D2[1] to D2[4]) at a timing when the data latch signal we002 is input from the data holding portion 806-001, and generates drive signals (P002 [1] to P002 [4]).

In addition, the data holding portion 806-002 outputs a data latch signal we003 obtained by delaying the input data latch signal we002 by one clock to the next data holding portion 806-003.

In this manner, the data holding portions 806-001 to 806-748 sequentially latch the pieces of image data while sequentially outputting the data latch signals.

The data holding portions 806-001 to 806-748 latch the image data and output the latched signal to the analog portion 801 as the drive signal. Since pieces of image data for four rows are latched by one data latch signal, the data holding portions 806-001 to 806-748 simultaneously output drive signals for four rows (for four pixels).

As described above, in a configuration in which the light emitting element 602 and the analog portion 801 are formed on the same chip, a voltage (−5 V) lower than a voltage (+5 V and the reference potential (GND)) supplied to the analog portion 801 is supplied to the cathode electrode of the light emitting element 602. As a result, since the analog portion 801 can be formed by a semiconductor process with a relatively low withstand voltage, the size of the analog portion 801 can be reduced, and the chip size can be reduced.

In addition, at the time of non-exposure, the potential of the cathode electrode of the light emitting element 602 connected to the −5 V power line 713 is brought into a floating state. As a result, it is possible to suppress a leakage current from the current control MOSFET 902 and the switching MOSFET 903 to the light emitting element 602, in which the leakage current is generated even in an OFF state at the time of non-exposure, and to suppress power consumption.

In the present embodiment, the analog portion 801 operates between a first potential +5 V and a second potential 0 V, and the light emitting element 602 operates between a third potential +1 V and a fourth potential −5 V. In addition, a potential difference between the third potential +1 V and the fourth potential −5 V is equal to or larger than a potential difference between the first potential +5 V and the second potential 0 V. As a result, in a configuration in which the light emitting element 602 and the analog portion 801 are formed as one chip, the analog portion 801 can be formed by a semiconductor process with a low withstand voltage while securing the forward voltage of the light emitting element 602, and the chip size can be reduced.

Further, in the present embodiment, the third potential +1 V is lower than the first potential +5 V, and the fourth potential −5 V is lower than the second potential 0 V. A potential difference between the second potential 0 V and the fourth potential −5 V is equal to or larger than the potential difference between the first potential +5 V and the second potential 0 V. The second potential 0 V is a ground potential, the first potential +5 V is a positive potential with respect to the ground potential, and the fourth potential −5 V is a negative potential with respect to the ground potential.

In addition, in the present embodiment, the potential of the cathode terminal K of the light emitting element 602 becomes at least the fifth potential 0 V higher than the fourth potential −5 V in a case where the switch 714 is switched in such a way as not to supply a current to the light emitting element 602. The fifth potential 0 V is equal to the second potential 0 V.

Furthermore, in the present embodiment, the fourth potential −5 V is lower than the first potential +5 V. The second potential 0 V is the ground potential. The third potential +1 V is higher than the second potential 0 V.

In the present embodiment, the voltage is not limited to +5 V and −5 V, and any voltage other than +5 V and −5 V can be supplied as long as the voltage can drive the light emitting element 602. For example, a 10 V voltage range of +4 V and −6 V may also be secured in addition to a 10 V voltage range of +5 V and −5 V.

In the present embodiment, 20 light emitting element array chips 400-1 to 400-20 are provided on the printed circuit board 202, but the present invention is not limited thereto, and any number of light emitting element array chips can be provided on the printed circuit board 202 as necessary.

Second Embodiment

Since a configuration of an image forming apparatus according to a second embodiment of the present invention is the same as that of the image forming apparatus 1 illustrated in FIG. 1, the description thereof is omitted. In addition, in a configuration of an exposure head according to the present embodiment, since configurations other than a circuit configuration of the exposure head is the same as those in FIGS. 3 to 8, the description of the configurations other than the circuit configuration of the exposure head is omitted.

The above-described first embodiment has a configuration in which the cathode electrodes of the plurality of light emitting elements 602 are common, but the present embodiment has a configuration in which anode electrodes of a plurality of light emitting elements 602 are common.

<Circuit Configuration of Exposure Head>

The circuit configuration of the exposure head according to the second embodiment of the present invention will be described in detail with reference to FIG. 17.

Figure 9:
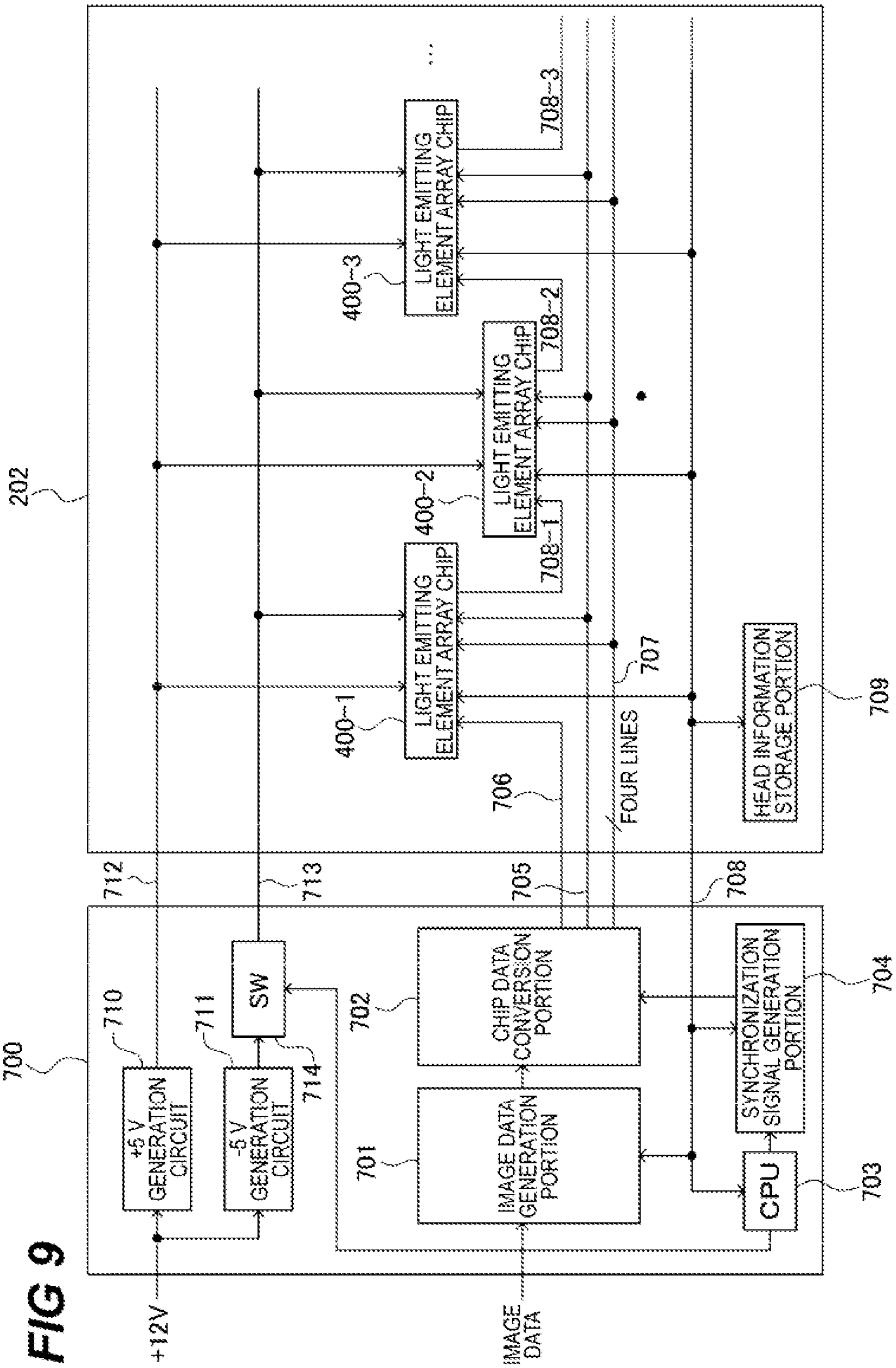
FIG. 9 is a block diagram illustrating a configuration of the exposure head according to the first embodiment of the present invention.
Figure 10:
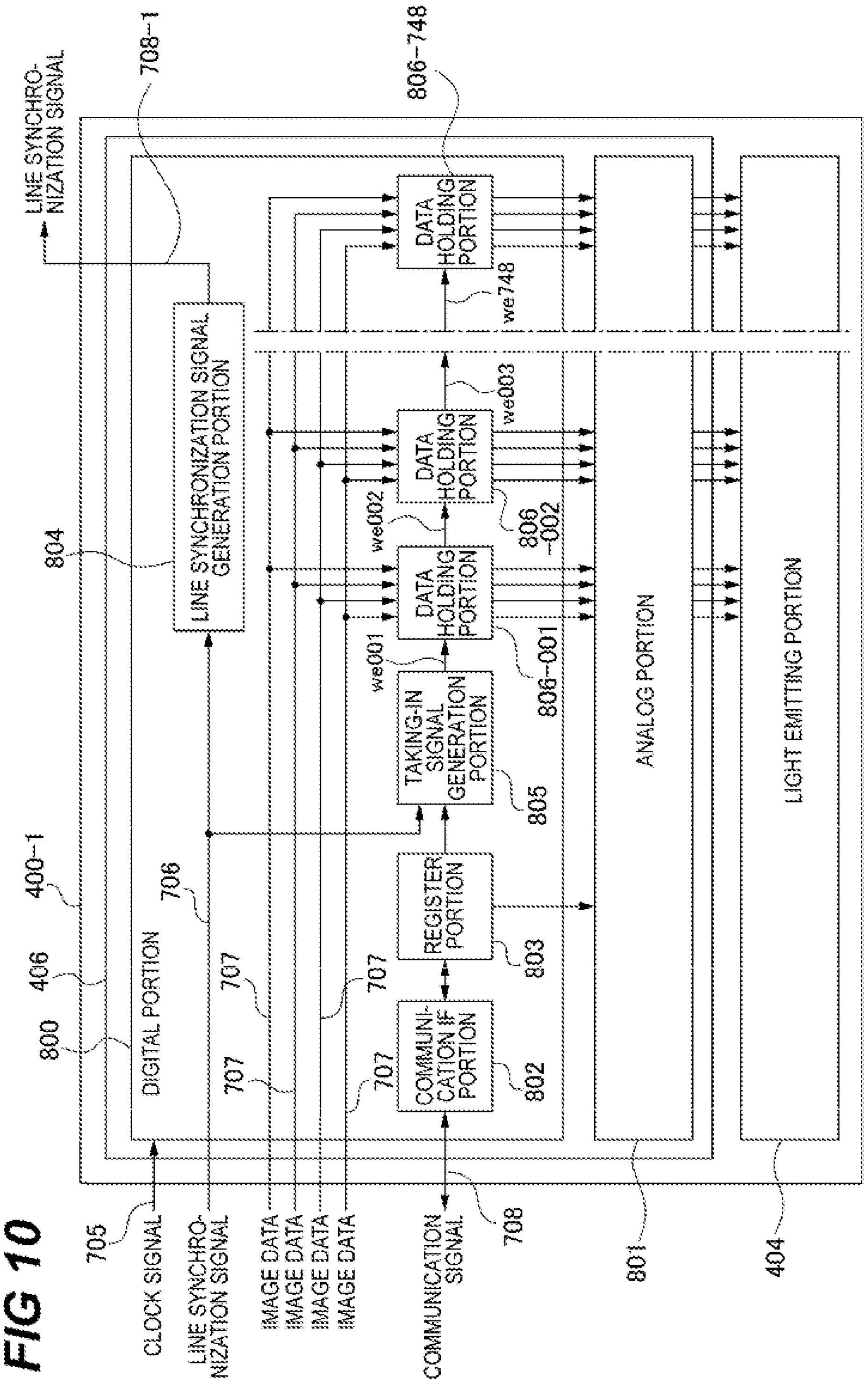
FIG. 10 is a block diagram illustrating a configuration of the light emitting element array chip of the exposure head according to the first embodiment of the present invention.
Figure 17:
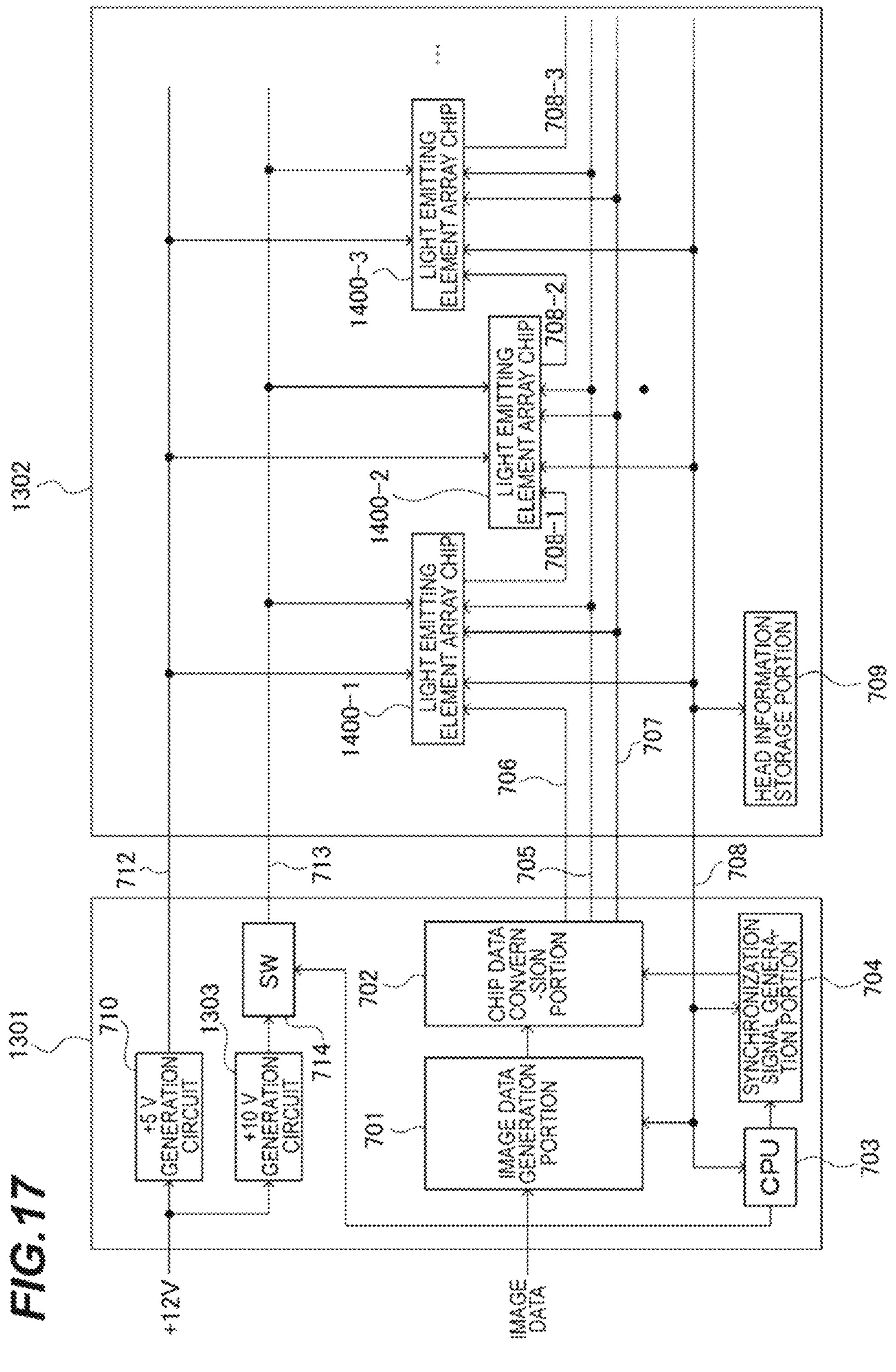
FIG. 17 is a block diagram illustrating a configuration of a light emitting element array chip of an exposure head according to a second embodiment of the present invention.

In FIG. 17, portions having the same configurations as those in FIG. 9 are denoted by the same reference signs, and the description thereof is omitted.

The exposure head according to the present embodiment includes an image controller portion 1301 that transmits a signal or data for controlling a printed circuit board 1302 to the printed circuit board 1302 and executes processing on image data and processing on an exposure timing. The signal and data transmitted from the image controller portion 1301 to the printed circuit board 1302 include a clock signal, image data, a line synchronization signal, and a communication signal.

Specifically, the image controller portion 1301 includes an image data generation portion 701, a chip data conversion portion 702, a CPU 703, a synchronization signal generation portion 704, a +5 V generation circuit 710, a switch 714, and a +10 V generation circuit 1303.

Here, the image controller portion 1301 and the printed circuit board 1302 are connected by a clock signal line 705, a line synchronization signal line 706, an image data signal line 707, a communication signal line 708, a +5 V power line 712, and a +10 V power line 1304.

The +10 V power line 1304 connects the switch 714 and each of light emitting element array chips 1400-1 to 1400-20.

The +10 V generation circuit 1303 converts a power supply voltage of +12 V applied from an external +12 V power supply into a voltage of +10 V and supplies the voltage to the switch 714. As the −5 V generation circuit 711, a general switching regulator circuit can be applied.

The switch 714 is turned on or off according to whether or not the power control signal is input from the CPU 703, thereby switching whether or not to supply a voltage of +10 V to the light emitting element array chip 1400. The switch 714 is turned on when the power control signal is input from the CPU 703, and supplies a voltage of +10 V to each of the light emitting element array chips 1400-1 to 1400-20 via the +10 V power line 1304. The +10 V power line 1304 is in a floating state in a case where the switch 714 is turned off and a voltage of +10 V is not supplied to the light emitting element array chips 1400-1 to 1400-20.

The printed circuit board 1302 includes a head information storage portion 709 and the light emitting element array chips 1400-1 to 1400-20. Note that arrangement and alignment of the light emitting element array chips 1400-1 to 1400-20 on the printed circuit board 1302 are the same as the arrangement and alignment of the light emitting element array chips 400-1 to 400-20 on the printed circuit board 302.

The light emitting element array chip 1400-1 and the light emitting element array chip 1400-2 are connected by a signal line 708-1. The light emitting element array chip 1400-2 and the light emitting element array chip 1400-3 are connected by a signal line 708-2. Similarly, the light emitting element array chip 1400-3 and subsequent light emitting element array chips are connected one after another by a signal line 708-3 and subsequent signal lines.

Each of the light emitting element array chips 1400-1 to 1400-20 generates a line synchronization signal for the next chip and outputs the line synchronization signal to the next light emitting element array chips 1400-2 to 1400-20 via the signal line 708-1 and subsequent signal lines. Each of the light emitting element array chips 1400-1 to 1400-20 causes the light emitting elements 602 to emit light based on the input clock signal, the line synchronization signal, the image data, and the set value set in the communication signal.

The head information storage portion 709 is connected to the CPU 703 via the communication signal line 708. The head information storage portion 709 is a storage device that stores head information such as light emission quantities and mounting position information of the light emitting element array chips 1400-1 to 1400-20.

Since light emitting portions of the light emitting element array chips 1400-1 to 1400-20 have the same configuration as the configuration of the light emitting portion 404 illustrated in FIG. 5, the description thereof is omitted.

<Circuit Configuration of Light Emitting Element Array Chip>

Figure 18:
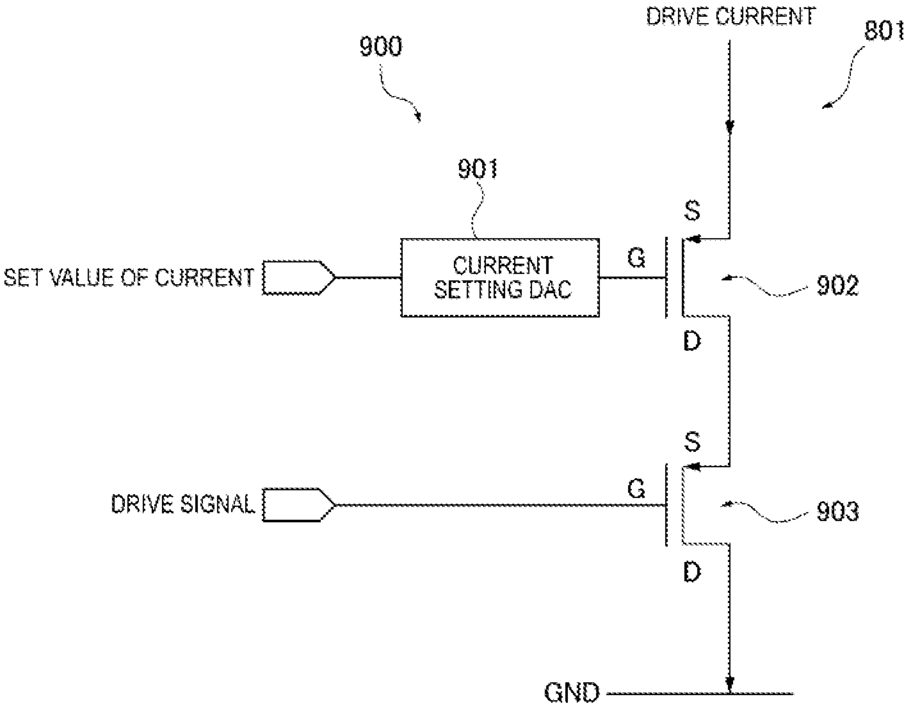
FIG. 18 is a block diagram illustrating a configuration of an analog portion of the exposure head according to the second embodiment of the present invention.

Circuit configurations of the light emitting element array chips 1400-1 to 1400-20 of the exposure head according to the second embodiment of the present invention will be described in detail with reference to FIG. 18.

Since the circuit configurations of the light emitting element array chips 1400-1 to 1400-20 are the same, the circuit configuration of the light emitting element array chip 1400-1 will be described, and the description of the circuit configurations of the light emitting element array chips 1400-2 to 1400-20 is omitted. In FIG. 18, portions having the same configurations as those in FIG. 12 are denoted by the same reference signs, and the description thereof is omitted.

The light emitting element array chip 1400-1 includes a light emitting portion 404 and a circuit portion 406. The circuit portion 406 includes the digital portion 800 and an analog portion 801.

In the present embodiment, 2992 drive circuits 900 (=748 × 4 rows) are provided for one of the light emitting element array chips 1400-1 to 1400-20. Since all the drive circuits 900 have the same configuration, only the configuration of one drive circuit 900 will be described in order to simplify the description.

A current control MOSFET 902 is a Pch MOSFET. The current control MOSFET 902 has a source terminal connected to a cathode of the light emitting element 602, a gate terminal connected to an output terminal of a current setting DAC 901, and a drain terminal connected to a source terminal of a switching MOSFET 903. The current control MOSFET 902 is configured in such a way that a current flowing from the source terminal to the drain terminal increases as an analog voltage input from the current setting DAC 901 increases.

The switching MOSFET 903 is a Pch MOSFET, and has the source terminal connected to the drain terminal of the current control MOSFET 902, a gate terminal connected to an output terminal of a data holding portion 806, and a drain terminal connected to a GND. Binary drive signals 1 to 4 indicating a high level or a low level are input from data holding portions 806-001 to 806-748 to the gate terminal of the switching MOSFET 903.

The switching MOSFET 903 is turned on when a high-level drive signal is input to the gate terminal, and is turned off when a low-level drive signal is input to the gate terminal. When a high-level drive signal is input to the gate terminal and the switching MOSFET 903 is turned on, a current that becomes a drive current for the light emitting element 602 controlled by the current control MOSFET 902 flows from the source terminal toward the drain terminal.

Next, a power supply configuration for each of the digital portion 800, the analog portion 801, and the light emitting element 602 will be described in detail with reference to FIG. 19.

Figure 19:
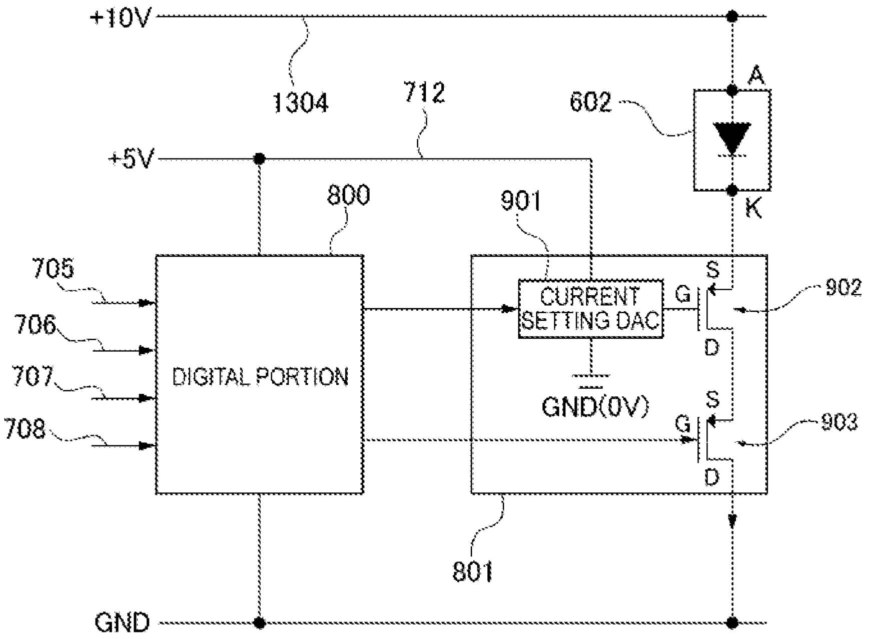
FIG. 19 is a block diagram illustrating a configuration of a power supply portion for the exposure head according to the second embodiment of the present invention.

In FIG. 19, portions having the same configurations as those in FIG. 11 are denoted by the same reference signs, and the description thereof is omitted. Further, in FIG. 19, in order to simplify the description, the description of blocks inside the digital portion 800 is omitted, and only one drive circuit 900 and one light emitting element 602 in the analog portion 801 are described.

A voltage of +10 V is supplied to an anode terminal A of the light emitting element 602 from the +10 V power line 1304, and a cathode terminal is connected to the source terminal of the current control MOSFET 902. The light emitting element 602 is, for example, an organic EL, and generally generates a forward voltage of about 6 V with a drive current of several μA. That is, a potential of the cathode terminal K of the light emitting element 602 becomes about +4 V obtained by subtracting 6 V from +10 V.

Since a drain-source voltage of the current control MOSFET 902 and the switching MOSFET 903 is about 1.5 V, a voltage of about 9 V is obtained by adding the drain-source voltage of 1.5 V×2=3 V to the forward voltage of 6 V of the light emitting element 602. Therefore, the light emitting element array chips 1400-1 to 1400-20 require a voltage of about 9 V or more in order to cause the light emitting elements 602 to emit light. Since the light emitting element array chips 1400-1 to 1400-20 can drive the light emitting elements 602 in a 10 V range of the GND (0 V) and +10 V, the light emitting elements 602 can emit light.

Hitherto, in a configuration in which an EL film is stacked on the circuit portion by deposition or the like, it is necessary to form the light emitting element array chip by using a semiconductor process of 9 V or more in consideration of a drain-source voltage of the MOSFET in order to secure the forward voltage of 6 V of the light emitting element. On the other hand, in the present embodiment, the GND and +10 V are supplied as the power supply voltages to drive the light emitting element 602 in the 10 V range, and the digital portion 800 and the analog portion 801 are configured by a semiconductor process of +5 V from the GND. As a result, in the present embodiment, the sizes of the current control MOSFET 902 and the switching MOSFET 903 can be reduced, and the chip sizes of the light emitting element array chips 1400-1 to 1400-20 can be reduced.

<Operation of Exposure Head>

Figure 20:
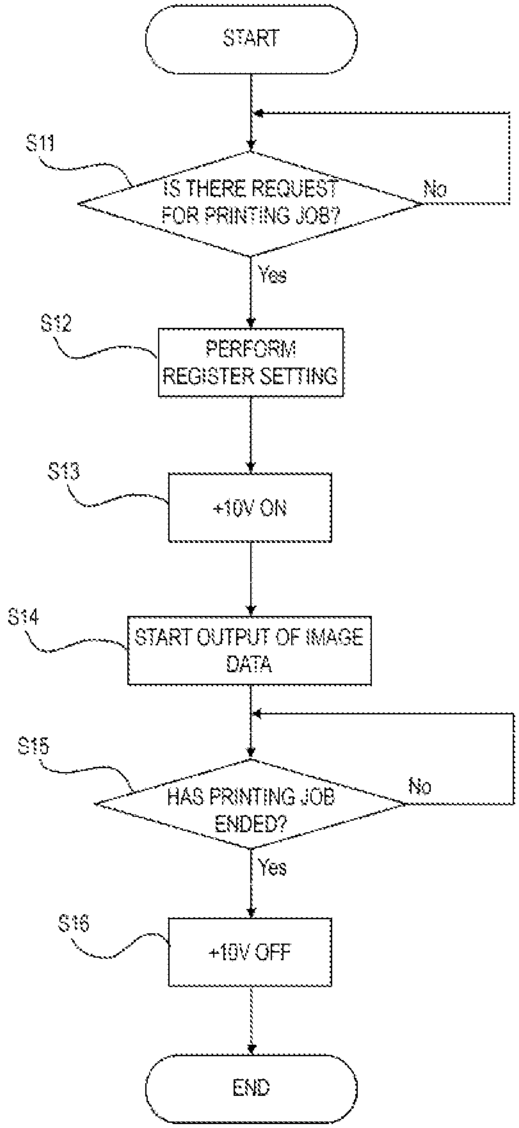
FIG. 20 is a flowchart of an operation of the exposure head according to the second embodiment of the present invention.

An operation of the exposure head 106 according to the second embodiment of the present invention will be described in detail with reference to FIGS. 20 and 21.

The exposure head 106 starts to operate at a timing when a main power supply of the image forming apparatus 1 is turned on.

First, the CPU 703 determines whether or not there is a request for a printing job from a user (S11).

In a case where there is no request for a printing job from the user (S11: No), the CPU 703 repeats the operation of step S11.

On the other hand, in a case where there is a request for a printing job from the user (S11: Yes), the CPU 703 writes a set value in register portions 803 of the light emitting element array chips 1400-1 to 1400-20 to perform register setting (S12).

Next, the CPU 703 outputs the power control signal to the switch 714 to supply a voltage of +10 V to the anode electrodes of the light emitting elements 602 of the light emitting element array chips 1400-1 to 1400-20 (+10 V ON) (S13).

Next, the CPU 703 starts outputting image data to the light emitting element array chips 1400-1 to 1400-20 at a predetermined timing to expose the photosensitive drum 102 (S14).

Next, the CPU 703 determines whether or not the printing job has ended (S15).

In a case where the printing job has not ended (S15: No), the CPU 703 repeats the operation of step S15.

On the other hand, in a case where the printing job has ended (S15: Yes), the CPU 703 stops transmitting the power control signal to the switch 714, thereby bringing a potential of the anode electrode of the light emitting element 602 into a floating state, and ending the operation.

Next, the operation of the exposure head 106 will be described in more detail with reference to FIG. 21.

Figure 21:
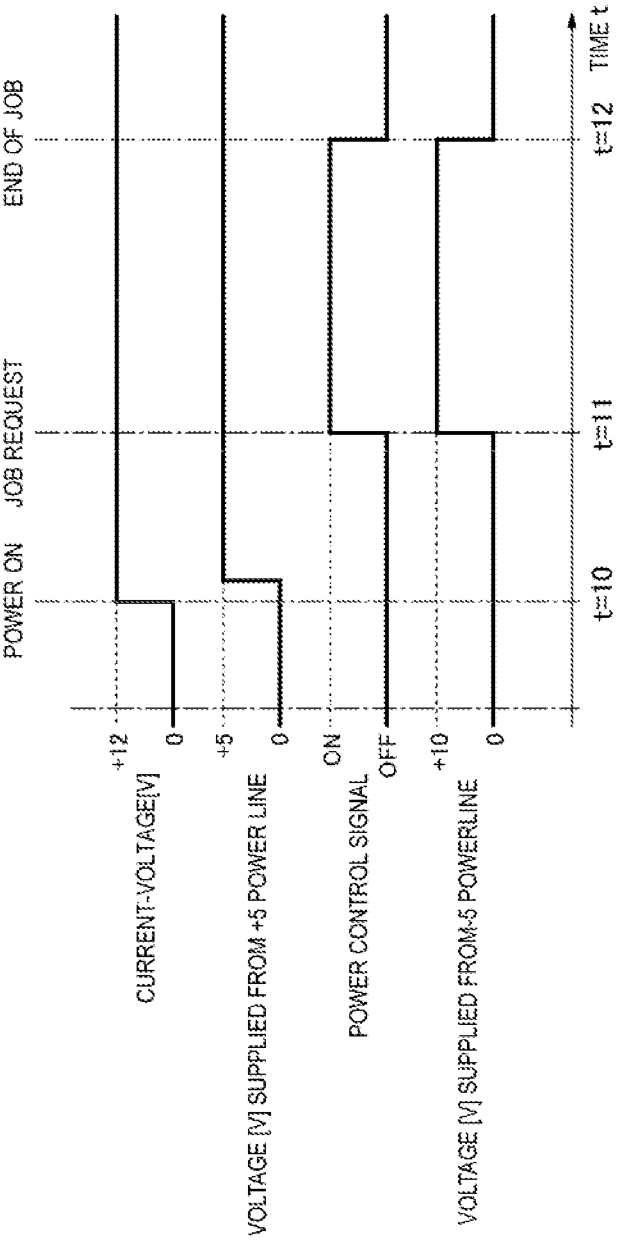
FIG. 21 is a timing chart of a power supply voltage supplied to the light emitting element array chip of the exposure head according to the second embodiment of the present invention.

Referring to FIG. 21, at time t=t10, the power supply of the image forming apparatus 1 is turned on, and a power supply voltage of +12 V is supplied to the +5 V generation circuit 710 and the +10 V generation circuit 1303. As a result, a voltage of the +5 V power line 712 becomes +5 V after time t=t10. At this time, since the switch 714 is turned off, a potential of the +10 V power line 1304 is in a floating state (0 V in FIG. 21).

At time t=t11, as a job request is received from the user, the CPU 703 outputs the power control signal to the switch 714, whereby the potential of the +10 V power line 1304 becomes +10 V, and the light emitting element 602 can be driven.

At time t=t12, as the job ends, the CPU 703 stops outputting the power control signal to the switch 714 and turns off the switch 714, thereby making the potential of the +10 V power line 1304 be in a floating state (0 V in FIG. 21).

As described above, in a configuration in which the light emitting element 602 and the analog portion 801 are formed on the same chip, a voltage (+10 V) higher than a voltage (+5 V and the reference potential (GND)) supplied to the analog portion 801 is supplied to the anode electrode of the light emitting element 602. As a result, since the analog portion 801 can be formed by a semiconductor process with a relatively low withstand voltage, the size of the analog portion 801 can be reduced, and the chip size can be reduced.

In addition, at the time of non-exposure, the potential of the anode electrode of the light emitting element 602 connected to the +10 V power line 1304 is brought into a floating state. As a result, it is possible to suppress a leakage current from the current control MOSFET 902 and the switching MOSFET 903 to the GND, in which the leakage current is generated even in an OFF state at the time of non-exposure, and to suppress power consumption.

In the present embodiment, the analog portion 801 operates between a first potential +5 V and a second potential 0 V, and the light emitting element 602 operates between a third potential +10 V and a fourth potential +4 V. In addition, a potential difference between the third potential +10 V and the fourth potential +4 V is equal to or larger than a potential difference between the first potential +5 V and the second potential 0 V. As a result, in a configuration in which the light emitting element 602 and the analog portion 801 are formed as one chip, the analog portion 801 can be formed by a semiconductor process with a low withstand voltage while securing the forward voltage of the light emitting element 602, and the chip size can be reduced.

Further, in the present embodiment, the third potential +10 V is higher than the first potential +5 V, and the fourth potential +4 V is higher than the second potential 0 V. A potential difference between the first potential +5 V and the third potential +10 V is equal to or larger than the potential difference between the first potential +5 V and the second potential 0 V.

In addition, in the present embodiment, the potential becomes at least the fifth potential of 0 V lower than the first potential +5 V in a case where the switch 714 is switched in such a way as not to supply a current to the light emitting element 602. The fifth potential 0 V is equal to the second potential 0 V.

Furthermore, in the present embodiment, the fourth potential +4 V is lower than the first potential +5 V. The second potential 0 V is the ground potential. The third potential +10 V is higher than the second potential 0 V.

In the present embodiment, the voltage is not limited to +5 V and +10 V, and may be a voltage other than 5 V and 10 V as long as the light emitting element 602 can be driven.

In the present embodiment, 20 light emitting element array chips 1400-1 to 1400-20 are provided on the printed circuit board 1302, but the present invention is not limited thereto, and any number of light emitting element array chips can be provided on the printed circuit board 1302 as necessary.

It goes without saying that the present invention is not limited to the above embodiment, and various modifications can be made without departing from the gist of the present invention.

Although the present invention has been described with reference to the exemplary embodiments, the present invention is not limited to the disclosed exemplary embodiments. The following claims are given the broadest interpretation to encompass all modifications, equivalent structures and functions.

What is claimed is:

1. An exposure head configured to expose a photosensitive drum, the exposure head comprising:

a substrate;

a plurality of strip-shaped semiconductor chips each including a plurality of light emitting elements that emit light and drive circuits each of which that drives one of the light emitting elements, the plurality of strip-shaped semiconductor chips being arranged on the substrate; and a lens array configured to collect light from the light emitting elements on the photosensitive drum, wherein each of the drive circuits operates between a first potential and a second potential, wherein each light emitting element of the plurality of light emitting elements operates between a third potential and a fourth potential, wherein a potential difference between the third potential and the fourth potential is equal to or greater than a potential difference between the first potential and the second potential wherein the second potential is a ground potential, wherein the first potential is a positive potential with respect to the ground potential, and wherein the fourth potential is a negative potential with respect to the ground potential.

2. The exposure head according to claim 1, wherein each of the light emitting elements has an anode terminal connected to the third potential and a cathode terminal connected to the fourth potential, the third potential is lower than the first potential, and the fourth potential is lower than the second potential.

3. The exposure head according to claim 1, wherein a potential difference between the second potential and the fourth potential is equal to or greater than the potential difference between the first potential and the second potential.

4. The exposure head according to claim 1, wherein each of the drive circuits includes a switching element arranged between the first potential and the light emitting elements and configured to switch whether or not to supply a current to the light emitting elements.

5. The exposure head according to claim 4, wherein a potential of a cathode terminal of each of the light emitting elements becomes at least a fifth potential greater than the fourth potential in a case where the switching element is switched in such a way as not to supply a current to the each of light emitting elements.

6. The exposure head according to claim 5, wherein the fifth potential is equal to the second potential.

7. The exposure head according to claim 1, wherein each of the light emitting elements has an anode terminal connected to the third potential and a cathode terminal connected to the fourth potential, wherein the third potential is greater than the first potential, and wherein the fourth potential is greater than the second potential.

8. The exposure head according to claim 7, wherein a potential difference between the first potential and the third potential is equal to or greater than the potential difference between the first potential and the second potential.

9. The exposure head according to claim 7, wherein each of the drive circuits includes a switching element arranged between the third potential and the light emitting elements and configured to switch whether or not to supply a current to the light emitting elements.

10. The exposure head according to claim 9, wherein a potential of the anode terminal of each of the light emitting elements becomes at least a fifth potential less than the first potential in a case where the switching element is switched in such a way as not to supply a current to the light emitting elements.

11. The exposure head according to claim 10, wherein the fifth potential is equal to the second potential.

12. The exposure head according to claim 1, wherein the fourth potential is less than the first potential.

13. The exposure head according to claim 1, wherein the second potential is a ground potential.

14. The exposure head according to claim 1, wherein the third potential is greater than the second potential.

15. The exposure head according to claim 1, wherein each of the light emitting elements includes an organic EL film.

16. The exposure head according to claim 15, wherein the organic EL film is formed on each of the drive circuits.

17. An image forming apparatus comprising:

a charger configured to charge the photosensitive drum;

the exposure head according to claim 1 configured to expose the photosensitive drum charged by the charger to form an electrostatic latent image on the photosensitive drum; and a development device configured to develop the electrostatic latent image to form a developer image on the photosensitive drum.

* * * * *